United States Patent
Sawaki

(10) Patent No.: US 10,894,211 B2
(45) Date of Patent: *Jan. 19, 2021

(54) INFORMATION PROCESSING METHOD, APPARATUS, AND SYSTEM FOR EXECUTING THE INFORMATION PROCESSING METHOD

(71) Applicant: COLOPL, Inc., Tokyo (JP)

(72) Inventor: Kazuaki Sawaki, Tokyo (JP)

(73) Assignee: COLOPL, INC., Tokyo (JP)

( * ) Notice: Subject to any disclaimer, the term of this patent is extended or adjusted under 35 U.S.C. 154(b) by 123 days.

This patent is subject to a terminal disclaimer.

(21) Appl. No.: 16/361,205

(22) Filed: Mar. 22, 2019

(65) Prior Publication Data

US 2019/0217197 A1 Jul. 18, 2019

Related U.S. Application Data

(63) Continuation of application No. 15/832,674, filed on Dec. 5, 2017, now Pat. No. 10,238,968.

(30) Foreign Application Priority Data

Dec. 6, 2016 (JP) .................................. 2016-236779
Dec. 6, 2016 (JP) .................................. 2016-236784

(51) Int. Cl.
*A63F 13/525* (2014.01)
*A63F 13/213* (2014.01)
(Continued)

(52) U.S. Cl.
CPC .......... *A63F 13/525* (2014.09); *A63F 13/211* (2014.09); *A63F 13/213* (2014.09);
(Continued)

(58) Field of Classification Search
CPC .................................................. G06F 3/0346
See application file for complete search history.

(56) References Cited

U.S. PATENT DOCUMENTS 6,429,874 B1 8/2002 Miura
2002/0060682 A1 5/2002 Kohira et al.
(Continued)

FOREIGN PATENT DOCUMENTS

JP 2002-140723 A 5/2002
JP 2002-149581 A 5/2002
(Continued)

OTHER PUBLICATIONS

"Facebook Mark Zuckerberg Social VR Demo OC3 Oculus Connect 3 Keynote", [online], Oct. 6, 2016, VRvibe [retrieved on Dec. 3, 2017], Internet <https://www.youtube.com/watch2v=NCpNKLXovtE>, 3pp.
(Continued)

*Primary Examiner* — Robert T Clarke, Jr.
(74) *Attorney, Agent, or Firm* — Hauptman Ham, LLP

(57) ABSTRACT

A method including defining a virtual space. The virtual space contains a first player character associated with a first user, a second player character associated with a second user, and virtual points of view for defining field-of-view images to be provided to a first HMD associated with the first user and to a second HMD associated with the second user. The method includes identifying first and second parts of the second player character. The method includes moving the first part in synchronization with a detected movement of the second user. The method includes displaying the second part in connection with a detected movement of the first part. The method includes setting a first transparency rate of the first part and a second transparency rate of the second part.
(Continued)

A transparency rate of at least a portion of the second part is greater than the transparency rate of the first part.

15 Claims, 17 Drawing Sheets

(51) Int. Cl.

| | |
|---|---|
| *G02B 27/01* | (2006.01) |
| *A63F 13/25* | (2014.01) |
| *A63F 13/335* | (2014.01) |
| *A63F 13/56* | (2014.01) |
| *A63F 13/211* | (2014.01) |
| *G06F 3/01* | (2006.01) |
| *G06F 3/0346* | (2013.01) |
| *G06T 15/50* | (2011.01) |
| *G06T 19/00* | (2011.01) |

(52) U.S. Cl.
CPC ............ *A63F 13/25* (2014.09); *A63F 13/335* (2014.09); *A63F 13/56* (2014.09); *G02B 27/01* (2013.01); *G06F 3/011* (2013.01); *G06F 3/012* (2013.01); *G06F 3/017* (2013.01); *G06F 3/0346* (2013.01); *G06T 15/503* (2013.01); *G06T 19/006* (2013.01)

(56) References Cited

U.S. PATENT DOCUMENTS

| | | |
|---|---|---|
| 2009/0024703 A1 | 1/2009 | Tamura |
| 2010/0203968 A1 | 8/2010 | Gill et al. |
| 2012/0188277 A1 | 7/2012 | Hebbar et al. |
| 2014/0354515 A1 | 12/2014 | La Valle et al. |

FOREIGN PATENT DOCUMENTS

| | | |
|---|---|---|
| JP | 2009-27423 A | 2/2009 |
| JP | 2009-223656 A | 10/2009 |
| JP | 2010-82335 A | 4/2010 |
| JP | 2010-532890 A | 10/2010 |
| JP | 2013-500511 A | 1/2013 |
| JP | 2015-132678 A | 7/2015 |

OTHER PUBLICATIONS

Office Action in JP Application No. 2016-236779, dated Jul. 4, 2017, 8pp.

Atsushi Okamoto et al., "The Development of Breaststroke Motion Learning System by VRML", Technical Report of IEICE, vol. 100 No. 716, The Institute of Electronics Information and Communication Engineers, Mar. 15, 2001, pp. 17-22, Japan, 7pp.

Satoshi Kokubo et al., "Development of Collaboraiton Support System for 3D Shape Evaluation in Virtual Space", Correspondence on Human Interface, vol. 5 No. 1, Human Interface Society, Jan. 24, 2003, pp. 51-54, Japan, 5pp.

Notice of Allowance in JP Application No. 2016-236779, dated Aug. 15, 2017, 6pp.

Office Action in JP Application No. 2016-236784, dated May 16, 2017, 6pp.

Office Action in JP Application No. 2016-236784, dated Sep. 12, 2017, 7pp.

Mitsuru Oi et al., "Controlling Voice Communications in InterSpace", NTT R&D vol. 47 No. 4, 1998, pp. 465-470, Japan, 9pp.

Screen captures from YouTube video clip entitled "Facebook Zuckerberg Oculus Iribe OC3 Keynote (Full) Social VR, Touch, ReactVR", 7 pages, uploaded on Oct. 16, 2016 by user "VRvibe". Retrieved from Internet: <https://www.youtube.com/watch?v=qdcricoPmRl&t=4237s>.

INFORMATION PROCESSING METHOD, APPARATUS, AND SYSTEM FOR EXECUTING THE INFORMATION PROCESSING METHOD

RELATED APPLICATIONS

The present application is a continuation of U.S. patent application Ser. No. 15/832,674 filed Dec. 5, 2017, which claims priority to Japanese Application Nos. 2016-236784 and 2016-236779, all filed on Dec. 6, 2016. The disclosures of the above-listed applications are hereby incorporated by reference herein in their entirety.

BACKGROUND

This disclosure relates to an information processing method, an apparatus, and a system for executing the information processing method.

In "Facebook Mark Zuckerberg Social VR Demo OC3 Oculus Connect 3 Keynote", [online], Oct. 6, 2016, VRvibe [retrieved on Dec. 5, 2016], Internet <https://www.youtube.com/watch?v=NCpNKLXovtE>, there is described a technology for operating, in a virtual space shared by a plurality of users, an avatar (player character) associated with each user based on operation by each user. With this technology, the plurality of users is provided with chat (hereinafter referred to as "VR chat") capabilities in the shared virtual space.

SUMMARY

According to at least one embodiment of this disclosure, there is provided an information processing method to be executed by a computer to provide a virtual space to a first user via a first head-mounted display. The information processing method includes generating virtual space data for defining a virtual space containing a first player character associated with a first user, a second player character associated with a second user, and a virtual camera for defining a field-of-view image to be provided to the first head-mounted display. The method further includes setting a transparency rate of the second player character contained in the field-of-view image, in which the second player character includes a first part whose movement in the virtual space is controlled in synchronization with movement of the second user and a second part, which is displayed in connection with the first part. The setting includes setting a transparency rate of at least a portion of the second part larger than a transparency rate of the first part.

DETAILED DESCRIPTION

Now, with reference to the drawings, embodiments of this disclosure are described. In the following description, like components are denoted by like reference symbols. The same applies to the names and functions of those components. Therefore, detailed description of those components is not repeated.

Configuration of HMD System

Figure 1:
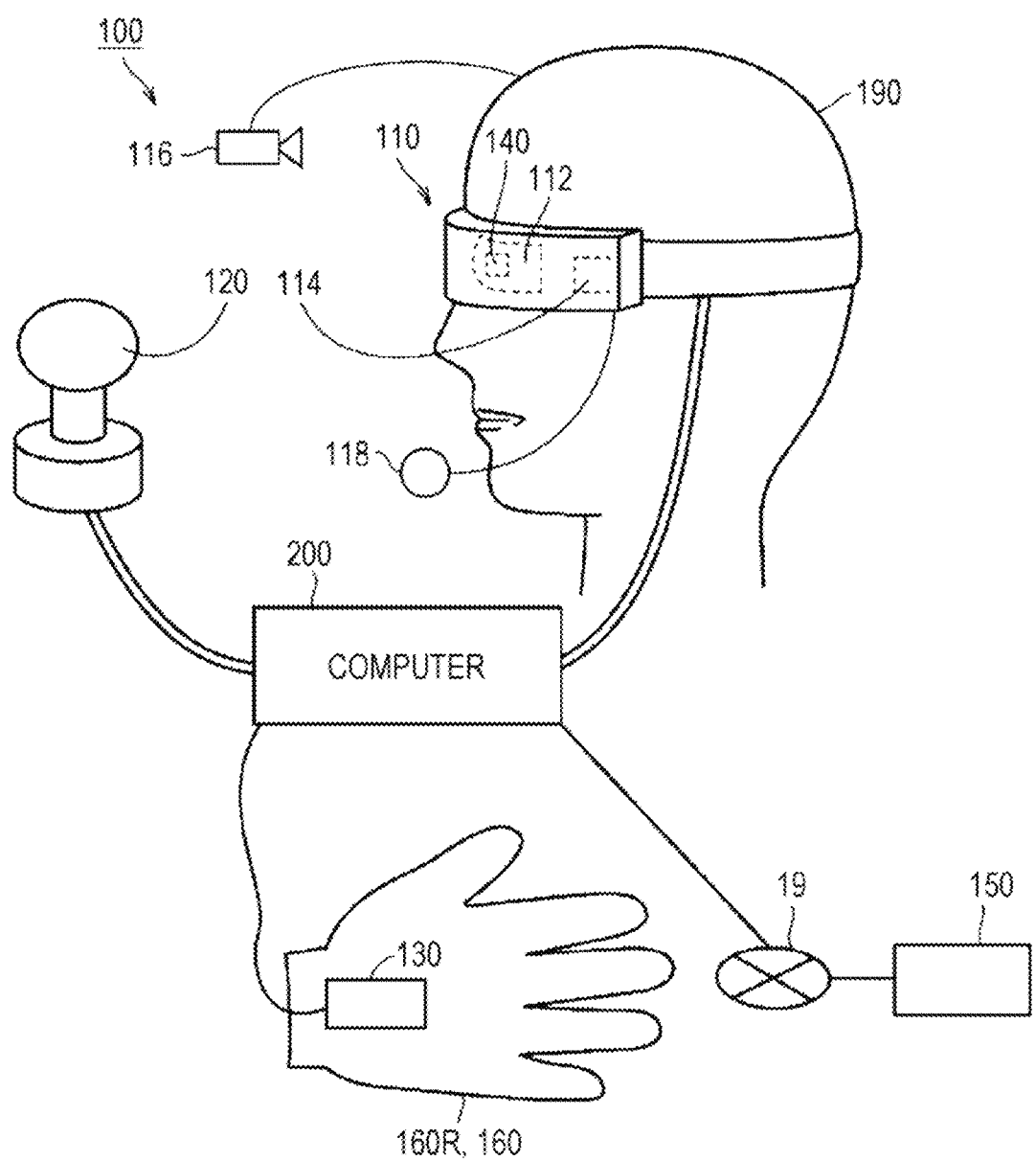
FIG. 1 is a diagram of a configuration of an HMD system 100 of at least one embodiment of this disclosure.

With reference to FIG. 1, a configuration of a head-mounted display (HMD) system 100 is described. FIG. 1 is a diagram of the configuration of the HMD system 100 of at least one embodiment of this disclosure. In one aspect, the HMD system 100 is provided as a system for household use or a system for professional use.

The HMD system 100 includes an HMD device 110, an HMD sensor 120, a controller 160, and a computer 200. The HMD device 110 includes a monitor 112, a camera 116, a microphone 118, and an eye gaze sensor 140. The controller 160 may include a motion sensor 130.

In one aspect, the computer 200 can be connected to a network 19, for example, the Internet, and can communicate to/from a server 150 or other computers connected to the network 19. In another aspect, the HMD device 110 may include a sensor 114 instead of the HMD sensor 120.

The HMD device 110 may be worn on a head of a user to provide a virtual space to the user during operation. More specifically, the HMD device 110 displays each of a right-eye image and a left-eye image on the monitor 112. When each eye of the user visually recognizes each image, the user may recognize the image as a three-dimensional image based on the parallax of both the eyes.

The monitor 112 is implemented as, for example, a non-transmissive display device. In one aspect, the monitor 112 is arranged on a main body of the HMD device 110 so as to be positioned in front of both the eyes of the user. Therefore, when the user visually recognizes the three-dimensional image displayed on the monitor 112, the user can be immersed in the virtual space. According to one embodiment of this disclosure, the virtual space includes, for example, a background, objects that can be operated by the user, and menu images that can be selected by the user. According to at least one embodiment of this disclosure, the monitor 112 may be implemented as a liquid crystal monitor or an organic electroluminescence (EL) monitor included in a so-called smart phone or other information display terminals.

In one aspect, the monitor 112 may include a sub-monitor for displaying a right-eye image and a sub-monitor for displaying a left-eye image. In another aspect, the monitor 112 may be configured to integrally display the right-eye image and the left-eye image. In this case, the monitor 112 includes a high-speed shutter. The high-speed shutter alternately displays the right-eye image and the left-eye image so that only one of the eyes can recognize the image.

The camera 116 acquires a face image of the user wearing the HMD device 110. The face image acquired by the camera 116 may be used to detect a facial expression of the user by image analysis processing. The camera 116 may be an infrared camera built into the body of the HMD device 110 so that the camera 116 detects, for example, movement of pupils, opening/closing of eyelids, and movement of eyebrows. Alternatively, the camera 116 may be an external camera arranged outside of the HMD device 110 in FIG. 1 so that the camera 116 detects movement of a mouth, cheek, and chin of the user, for example. The camera 116 may be constructed from both of the infrared camera and the external camera described above.

The microphone 118 acquires a voice uttered by the user. The voice acquired by the microphone 118 may be used to detect an emotion of the user by voice analysis processing. The voice may also be used to give a voice instruction to the virtual space 2. The voice may be transmitted to an HMD system used by another user via, for example, the network 19 and the server 150, and output by, for example, a speaker connected to the HMD system. With this, a conversation (chat) between users sharing the virtual space is implemented.

In one aspect, the HMD sensor 120 includes a plurality of light sources (not shown). Each light source is implemented by, for example, a light emitting diode (LED) configured to emit an infrared ray. The HMD sensor 120 has a position tracking function for detecting the movement of the HMD device 110. The HMD sensor 120 uses this function to detect the position and the inclination of the HMD device 110 in a real space.

In another aspect, the HMD sensor 120 may be implemented by a camera. In this case, the HMD sensor 120 may use image information of the HMD device 110 output from the camera to execute image analysis processing, to thereby enable detection of the position and the inclination of the HMD device 110.

In another aspect, the HMD device 110 may include the sensor 114 instead of the HMD sensor 120 as a position detector. The HMD device 110 may use the sensor 114 to detect the position and the inclination of the HMD device 110. For example, when the sensor 114 is an angular velocity sensor, a geomagnetic sensor, an acceleration sensor, or a gyrosensor, the HMD device 110 may use any of those sensors instead of the HMD sensor 120 to detect the position and the inclination of the HMD device 110 itself. As an example, when the sensor 114 is an angular velocity sensor, the angular velocity sensor detects over time the angular velocity about each of three axes of the HMD device 110 in the real space. The HMD device 110 calculates a temporal change of the angle about each of the three axes of the HMD device 110 based on each angular velocity, and calculates an inclination of the HMD device 110 based on the temporal change of the angles. The HMD device 110 may include a transmissive display device. In this case, the transmissive display device may be configured as a display device that is temporarily non-transmissive by adjusting the transparency rate of the display device. The field-of-view image may include a section for presenting a real space on a part of the image forming the virtual space. For example, an image photographed by a camera mounted to the HMD device 110 may be superimposed and displayed on a part of the field-of-view image, or the real space may be visually recognized from a part of the field-of-view image by increasing the transparency rate of a part of the transmissive display device.

The eye gaze sensor 140 detects a direction (line-of-sight direction) in which the lines of sight of the right eye and the left eye of a user 190 are directed. The direction is detected by, for example, a known eye tracking function. The eye gaze sensor 140 is implemented by a sensor having the eye tracking function. In one aspect, the eye gaze sensor 140 is preferred to include a right-eye sensor and a left-eye sensor. The eye gaze sensor 140 may be, for example, a sensor configured to irradiate the right eye and the left eye of the user 190 with an infrared ray, and to receive reflection light from the cornea and the iris with respect to the irradiation ray, to thereby detect a rotational angle of each eyeball. The eye gaze sensor 140 can detect the line-of-sight direction of the user 190 based on each detected rotational angle.

The server 150 may transmit a program to the computer 200. In another aspect, the server 150 may communicate to/from another computer 200 for providing virtual reality to an HMD device used by another user. For example, when a plurality of users play a participatory game in an amusement facility, each computer 200 communicates to/from another computer 200 with a signal based on the motion of each user, to thereby enable the plurality of users to enjoy a common game in the same virtual space.

The controller 160 receives input of a command from the user 190 to the computer 200. In one aspect, the controller 160 can be held by the user 190. In another aspect, the controller 160 can be mounted to the body or a part of the clothes of the user 190. In another aspect, the controller 160 may be configured to output at least any one of a vibration, a sound, or light based on the signal transmitted from the computer 200. In another aspect, the controller 160 receives an operation given by from the user 190 to control, for example, the position and the movement of an object arranged in the space for providing virtual reality.

In one aspect, the motion sensor 130 is mounted on the hand of the user to detect the movement of the hand of the user. For example, the motion sensor 130 detects a rotational speed and the number of rotations of the hand. The detected signal is transmitted to the computer 200. The motion sensor 130 is provided to, for example, the glove-type controller 160. According to at least one embodiment of this disclosure, for the safety in the real space, the motion sensor 130 is mounted on an object like a glove-type object that does not easily fly away by being worn on a hand of the user 190. In another aspect, a sensor that is not mounted on the user 190 may detect the movement of the hand of the user 190. For example, a signal of a camera that photographs the user 190 may be input to the computer 200 as a signal representing the motion of the user 190. The motion sensor 130 and the computer 200 are connected to each other through wired or wireless communication. In the case of wireless communication, the communication mode is not particularly limited, and for example, Bluetooth (R) or other known communication methods may be used.

Hardware Configuration

Figure 2:
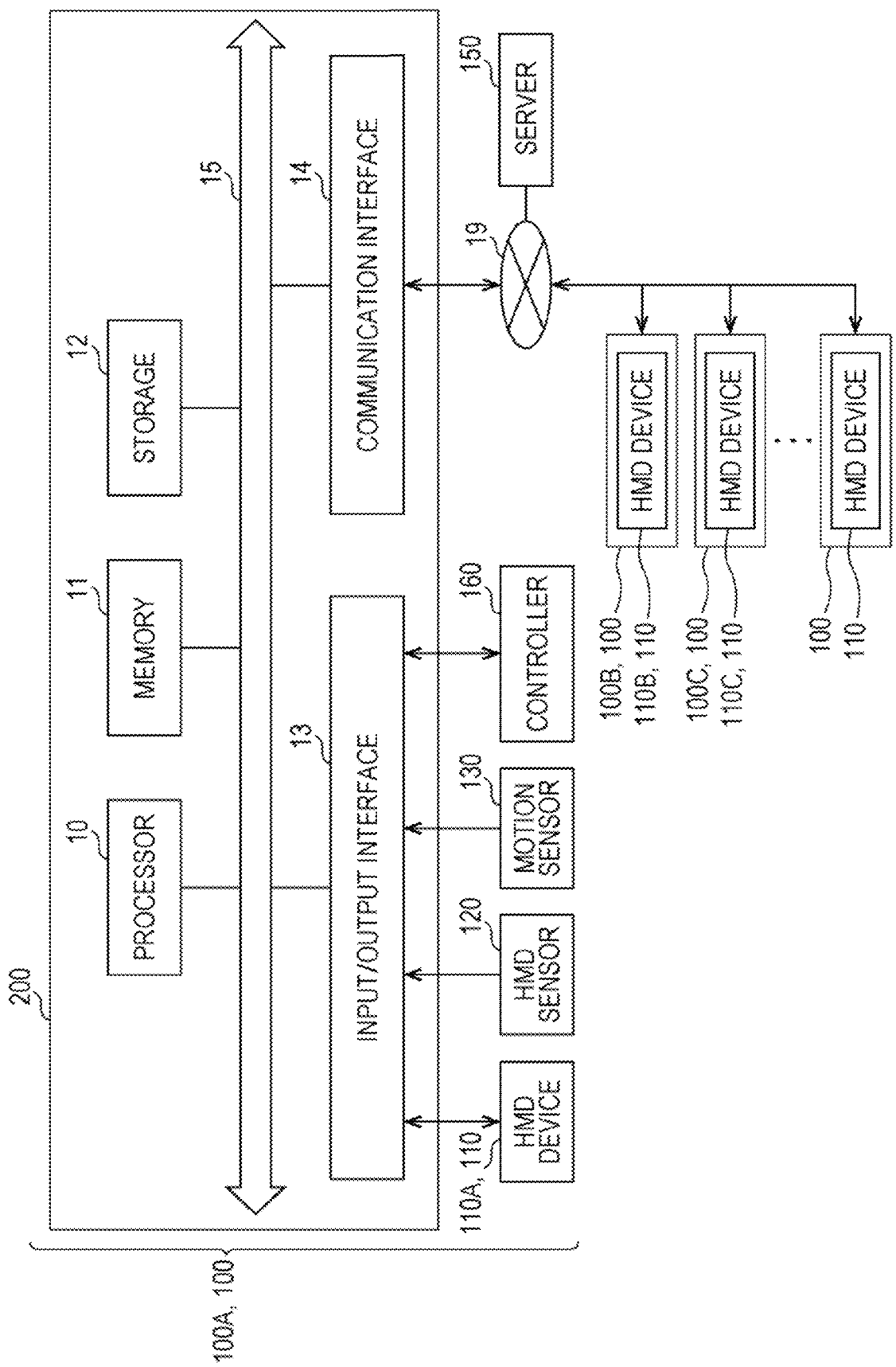
FIG. 2 is a block diagram of a hardware configuration of a computer 200 according to at least one embodiment.

With reference to FIG. 2, the computer 200 of this embodiment is described. FIG. 2 is a block diagram of the hardware configuration of the computer 200 according to at least one embodiment. The computer 200 includes, as primary components, a processor 10, a memory 11, a storage 12, an input/output interface 13, and a communication interface 14. Each component is connected to a bus 15.

The processor 10 executes a series of commands included in a program stored in the memory 11 or the storage 12 based on a signal transmitted to the computer 200 or on satisfaction of a condition determined in advance. In one aspect, the processor 10 is implemented as a central processing unit (CPU), a micro-processor unit (MPU), a field-programmable gate array (FPGA), or other devices.

The memory 11 temporarily stores programs and data. The programs are loaded from, for example, the storage 12. The data stored in the new memory 11 includes data input to the computer 200 and data generated by the processor 10. In one aspect, the memory 11 is implemented as a random access memory (RAM) or other volatile memories.

The storage 12 permanently stores programs and data. The storage 12 is implemented as, for example, a read-only memory (ROM), a hard disk device, a flash memory, or other non-volatile storage devices. The programs stored in the storage 12 include, for example, programs for providing a virtual space in the HMD system 100, simulation programs, game programs, user authentication programs, and programs for implementing communication to/from other computers 200. The data stored in the storage 12 includes data and objects for defining the virtual space.

In another aspect, the storage 12 may be implemented as a removable storage device like a memory card. In another aspect, a configuration that uses programs and data stored in an external storage device may be used instead of the storage 12 built into the computer 200. With such a configuration, for example, in a situation in which a plurality of HMD systems 100 are used as in an amusement facility, the programs, the data, and the like can be collectively updated.

According to at least one embodiment of this disclosure, the input/output interface 13 allows communication of signals among the HMD device 110, the HMD sensor 120, and the motion sensor 130. In one aspect, the input/output interface 13 is implemented with use of a universal serial bus (USB) interface, a digital visual interface (DVI), a high-definition multimedia interface (HDMI) (R), or other terminals. The input/output interface 13 is not limited to ones described above.

According to at least one embodiment of this disclosure, the input/output interface 13 may communicate to/from the controller 160. For example, the input/output interface 13 receives input of a signal output from the motion sensor 130. In another aspect, the input/output interface 13 transmits to the controller 160 a command output from the processor 10. The command instructs the controller 160 to vibrate, output a sound, emit light, or the like. When the controller 160 receives the command, the controller 160 executes anyone of vibration, sound output, and light emission in accordance with the command.

The communication interface 14 is connected to the network 19 to communicate to/from other computers (e.g., server 150) connected to the network 19. In one aspect, the communication interface 14 is implemented as, for example, a local area network (LAN) or other wired communication interfaces, or as wireless fidelity (WiFi), Bluetooth (R), near field communication (NFC), or other wireless communication interfaces. The communication interface 14 is not limited to ones described above.

In one aspect, the processor 10 accesses the storage 12 and loads one or more programs stored in the storage 12 to the memory 11 to execute a series of commands included in the program. The one or more programs may include, for example, an operating system of the computer 200, an application program for providing a virtual space, and game software that can be executed in the virtual space with use of the controller 160. The processor 10 transmits a signal for providing a virtual space to the HMD device 110 via the input/output interface 13. The HMD device 110 displays a video on the monitor 112 based on the signal.

The server 150 is connected to each control device of the plurality of HMD systems 100 via the network 19. In FIG. 2, the server 150 connects the plurality of HMD systems 100 including an HMD system 100A including an HMD device 110A (first head-mounted display); an HMD system 100B including an HMD device 110B; and an HMD system 100C including an HMD device 110C, so that those plurality of HMD systems 100 can communicate to/from one another. As a result, users of the HMD systems are provided with virtual experiences in a shared virtual space. The HMD system 100A, the HMD system 100B, the HMD system 100C, and the other HMD systems 100 all have similar configurations.

In FIG. 2, the computer 200 is provided outside of the HMD device 110, but in another aspect, the computer 200 may be built into the HMD device 110. As an example, a portable information communication terminal (e.g., smart phone) including the monitor 112 may function as the computer 200.

The computer 200 may be used in common among a plurality of HMD devices 110. With such a configuration, for example, the same virtual space can be provided to a plurality of users, and hence each user can enjoy the same application with other users in the same virtual space. In such a case, the plurality of HMD systems 100 in this embodiment may be directly connected to the computer 200 via the input/output interface 13. The functions (e.g., synchronization processing described later) of the server 150 in at least one embodiment may be implemented by the computer 200.

According to at least one embodiment of this disclosure, in the HMD system 100, a global coordinate system is set in advance. The global coordinate system has three reference directions (axes) that are respectively parallel to a vertical direction, a horizontal direction orthogonal to the vertical direction, and a front-rear direction orthogonal to both of the vertical direction and the horizontal direction in a real space. In at least one embodiment, the global coordinate system is one type of point-of-view coordinate system. Hence, the horizontal direction, the vertical direction (up-down direction), and the front-rear direction in the global coordinate system are defined as an x axis, a y axis, and a z axis, respectively. More specifically, the x axis of the global coordinate system is parallel to the horizontal direction of the real space, the y axis thereof is parallel to the vertical direction of the real space, and the z axis thereof is parallel to the front-rear direction of the real space.

In one aspect, the HMD sensor 120 includes an infrared sensor. When the infrared sensor detects the infrared ray emitted from each light source of the HMD device 110, the infrared sensor detects the presence of the HMD device 110. The HMD sensor 120 detects the position and the inclination of the HMD device 110 in the real space in accordance with the movement of the user 190 wearing the HMD device 110 based on the value of each point (each coordinate value in the global coordinate system). In more detail, the HMD sensor 120 can detect the temporal change of the position and the inclination of the HMD device 110 with use of each value detected over time.

The global coordinate system is parallel to a coordinate system of the real space. Therefore, each inclination of the HMD device 110 detected by the HMD sensor 120 corresponds to each inclination about each of the three axes of the HMD device 110 in the global coordinate system. The HMD sensor 120 sets a uvw visual-field coordinate system to the HMD device 110 based on the inclination of the HMD device 110 in the global coordinate system. The uvw visual-field coordinate system set to the HMD device 110 corresponds to a point-of-view coordinate system used when the user 190 wearing the HMD device 110 views an object in the virtual space.

Uvw Visual-Field Coordinate System

Figure 3:
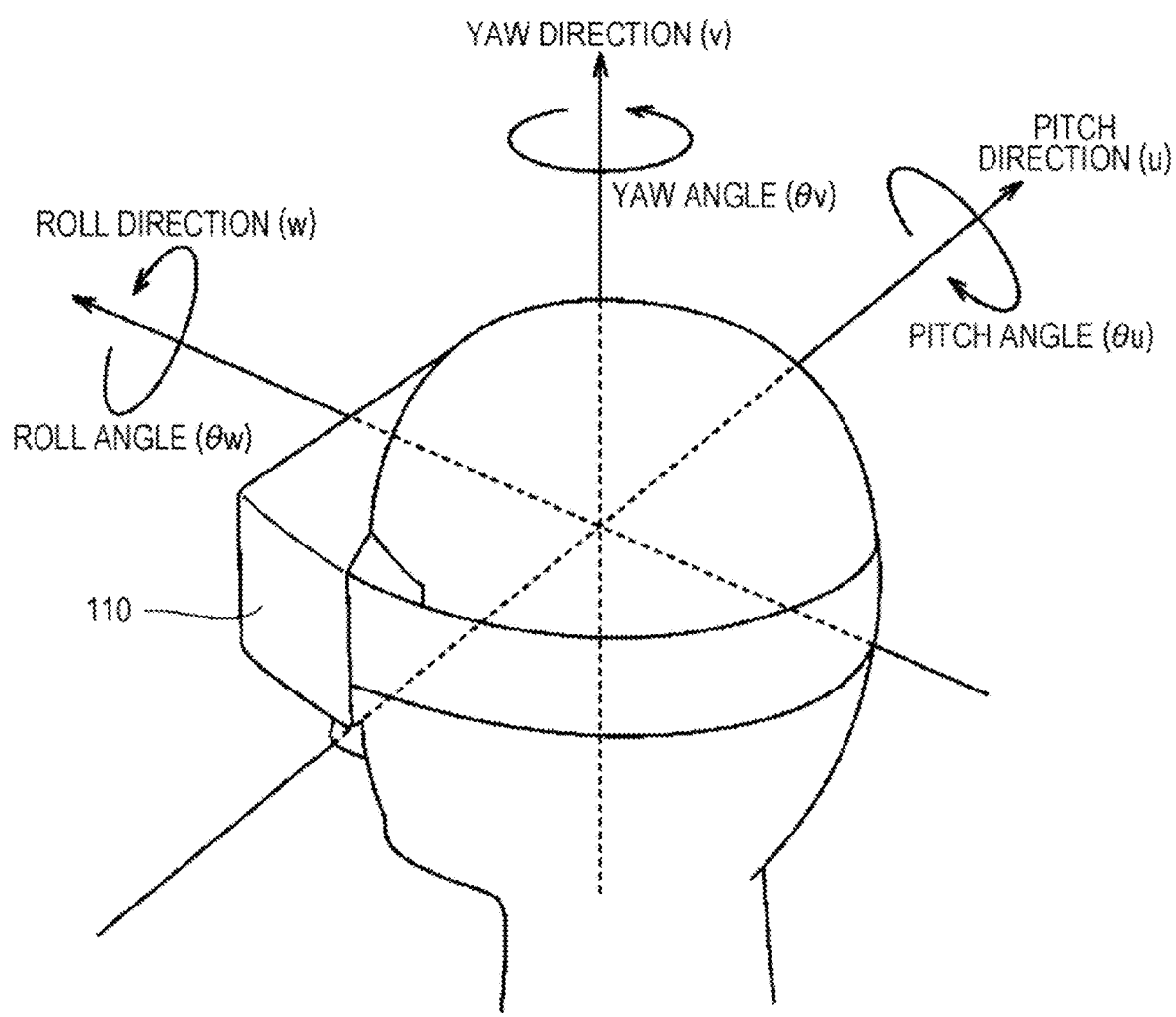
FIG. 3 is a diagram of a uvw visual-field coordinate system to be set for an HMD device 110 of at least one embodiment of this disclosure.

With reference to FIG. 3, the uvw visual-field coordinate system is described. FIG. 3 is a diagram of a uvw visual-field coordinate system to be set for the HMD device 110 of at least one embodiment of this disclosure. The HMD sensor 120 detects the position and the inclination of the HMD device 110 in the global coordinate system when the HMD device 110 is activated. The processor 10 sets the uvw visual-field coordinate system to the HMD device 110 based on the detected values.

In FIG. 3, the HMD device 110 sets the three-dimensional uvw visual-field coordinate system defining the head of the user wearing the HMD device 110 as a center (origin). More specifically, the HMD device 110 sets three directions newly obtained by inclining the horizontal direction, the vertical direction, and the front-rear direction (x axis, y axis, and z axis), which define the global coordinate system, about the respective axes by the inclinations about the respective axes of the HMD device 110 in the global coordinate system as a pitch direction (u axis), a yaw direction (v axis), and a roll direction (w axis) of the uvw visual-field coordinate system in the HMD device 110.

In one aspect, when the user 190 wearing the HMD device 110 is standing upright and is visually recognizing the front side, the processor 10 sets the uvw visual-field coordinate system that is parallel to the global coordinate system to the HMD device 110. In this case, the horizontal direction (x axis), the vertical direction (y axis), and the front-rear direction (z axis) of the global coordinate system match the pitch direction (u axis), the yaw direction (v axis), and the roll direction (w axis) of the uvw visual-field coordinate system in the HMD device 110, respectively.

After the uvw visual-field coordinate system is set to the HMD device 110, the HMD sensor 120 can detect the inclination (change amount of inclination) of the HMD device 110 in the set uvw visual-field coordinate system based on the movement of the HMD device 110. In this case, the HMD sensor 120 detects, as the inclination of the HMD device 110, each of a pitch angle ($\theta u$), a yaw angle ($\theta v$), and a roll angle ($\theta w$) of the HMD device 110 in the uvw visual-field coordinate system. The pitch angle ($\theta u$) represents an inclination angle of the HMD device 110 about the pitch direction in the uvw visual-field coordinate system. The yaw angle ($\theta v$) represents an inclination angle of the HMD device 110 about the yaw direction in the uvw visual-field coordinate system. The roll angle ($\theta w$) represents an inclination angle of the HMD device 110 about the roll direction in the uvw visual-field coordinate system.

The HMD sensor 120 sets, to the HMD device 110, the uvw visual-field coordinate system of the HMD device 110 obtained after the movement of the HMD device 110 based on the detected inclination angle of the HMD device 110. The relationship between the HMD device 110 and the uvw visual-field coordinate system of the HMD device 110 is always constant regardless of the position and the inclination of the HMD device 110. When the position and the inclination of the HMD device 110 change, the position and the inclination of the uvw visual-field coordinate system of the HMD device 110 in the global coordinate system change in synchronization with the change of the position and the inclination.

In one aspect, the HMD sensor 120 may identify the position of the HMD device 110 in the real space as a position relative to the HMD sensor 120 based on the light intensity of the infrared ray or a relative positional relationship between a plurality of points (e.g., distance between points), which is acquired based on output from the infrared sensor. The processor 10 may determine the origin of the uvw visual-field coordinate system of the HMD device 110 in the real space (global coordinate system) based on the identified relative position.

Virtual Space

Figure 4:
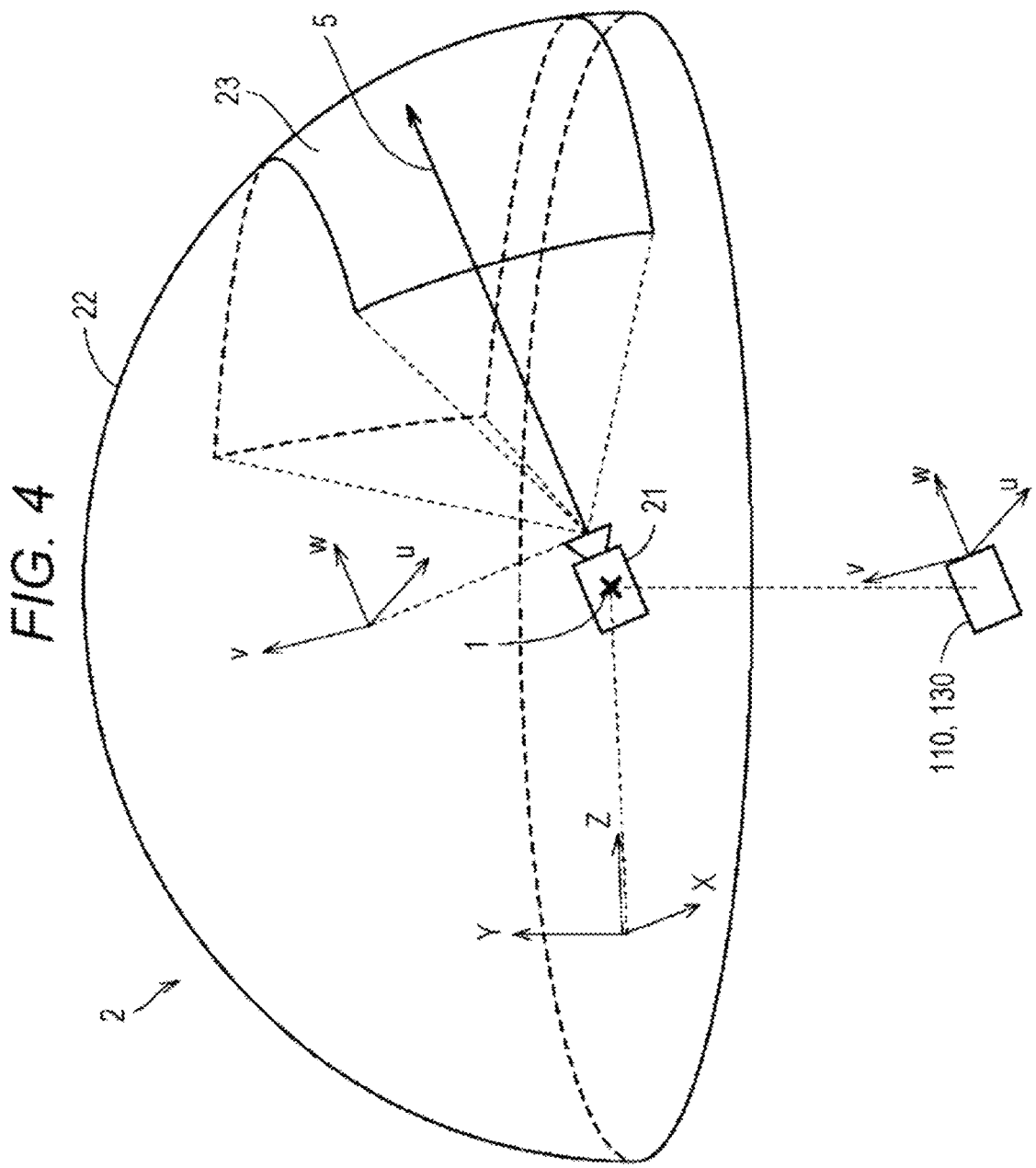
FIG. 4 is a diagram of a mode of expressing a virtual space 2 of at least one embodiment of this disclosure.

With reference to FIG. 4, the virtual space is further described. FIG. 4 is a diagram of a mode of expressing a virtual space 2 of at least one embodiment of this disclosure. The virtual space 2 has a structure with an entire celestial sphere shape covering a center 21 in all 360-degree directions. In FIG. 4, in order to avoid complicated description, only the upper-half celestial sphere of the virtual space 2 is exemplified. Mesh sections are defined in the virtual space 2. The position of each mesh section is defined in advance as coordinate values in an XYZ coordinate system defined in the virtual space 2. The computer 200 associates each partial image forming content (e.g., still image or moving image) that can be developed in the virtual space 2 with each corresponding mesh section in the virtual space 2, to thereby provide to the user the virtual space 2 in which a virtual space image 22 that can be visually recognized by the user is developed.

In one aspect, in the virtual space 2, the XYZ coordinate system having the center 21 as the origin is defined. The XYZ coordinate system is, for example, parallel to the global coordinate system. The XYZ coordinate system is one type of the point-of-view coordinate system, and hence the horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the global coordinate system, the Y axis (vertical direction) of the XYZ coordinate system is parallel to the y axis of the global coordinate system, and the Z axis (front-rear direction) of the XYZ coordinate system is parallel to the z axis of the global coordinate system.

When the HMD device 110 is activated, that is, when the HMD device 110 is in an initial state, a virtual camera 1 is arranged at the center 21 of the virtual space 2. In synchronization with the movement of the HMD device 110 in the real space, the virtual camera 1 similarly moves in the virtual space 2. With this, the change in position and direction of the HMD device 110 in the real space is reproduced similarly in the virtual space 2.

The uvw visual-field coordinate system is defined in the virtual camera 1 similarly to the case of the HMD device 110. The uvw visual-field coordinate system of the virtual camera in the virtual space 2 is defined to be synchronized with the uvw visual-field coordinate system of the HMD device 110 in the real space (global coordinate system). Therefore, when the inclination of the HMD device 110 changes, the inclination of the virtual camera 1 also changes in synchronization therewith. The virtual camera 1 can also move in the virtual space 2 in synchronization with the movement of the user wearing the HMD device 110 in the real space.

The direction of the virtual camera 1 is determined based on the position and inclination of the virtual camera 1, and thus the line of sight (reference line of sight 5) serving as a reference when the user recognizes the virtual space image 22 is determined based on the direction of the virtual camera 1. The processor 10 of the computer 200 defines a field-of-view region 23 in the virtual space 2 based on the reference line of sight 5. The field-of-view region 23 corresponds to, of the virtual space 2, the region that is visually recognized by the user wearing the HMD device 110.

The line-of-sight direction of the user 190 detected by the eye gaze sensor 140 is a direction in the point-of-view coordinate system obtained when the user 190 visually recognizes an object. The uvw visual-field coordinate system of the HMD device 110 is equal to the point-of-view coordinate system used when the user 190 visually recognizes the monitor 112. The uvw visual-field coordinate system of the virtual camera 1 is synchronized with the uvw visual-field coordinate system of the HMD device 110. Therefore, in the HMD system 100 in one aspect, the line-of-sight direction of the user 190 detected by the eye gaze sensor 140 can be regarded as the user's line-of-sight direction in the uvw visual-field coordinate system of the virtual camera 1.

User's Line of Sight

Figure 5:
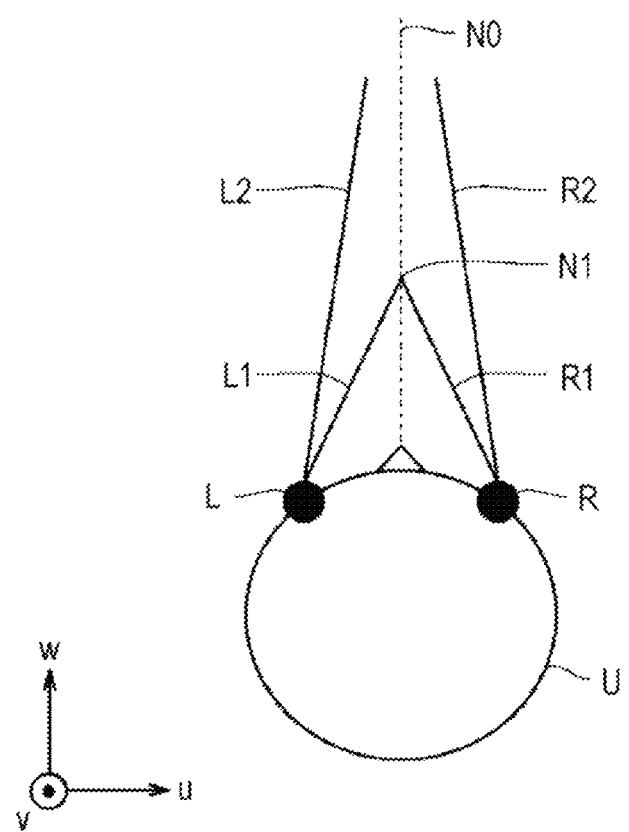
FIG. 5 is a top view diagram of a head of a user 190 wearing the HMD device 110 of at least one embodiment of this disclosure.

With reference to FIG. 5, determination of the user's line-of-sight direction is described. FIG. 5 is a top view diagram of the head of the user 190 wearing the HMD device 110 of at least one embodiment of this disclosure.

In one aspect, the eye gaze sensor 140 detects lines of sight of the right eye and the left eye of the user 190. In one aspect, when the user 190 is looking at a near place, the eye gaze sensor 140 detects lines of sight R1 and L1. In another aspect, when the user 190 is looking at a far place, the eye gaze sensor 140 detects lines of sight R2 and L2. In this case, the angles formed by the lines of sight R2 and L2 with respect to the roll direction w are smaller than the angles formed by the lines of sight R1 and L1 with respect to the roll direction w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line-of-sight direction N0 of the user 190 based on the identified point of gaze N1. The computer 200 detects, for example, an extension direction of a straight line that passes through the point of gaze N1 and a midpoint of a straight line connecting a right eye R and a left eye L of the user 190 to each other as the line-of-sight direction N0. The line-of-sight direction N0 is a direction in which the user 190 actually directs his or her lines of sight with both eyes. The line-of-sight direction N0 corresponds to a direction in which the user 190 actually directs his or her lines of sight with respect to the field-of-view region 23.

In another aspect, the HMD system 100 may include a television broadcast reception tuner. With such a configuration, the HMD system 100 can display a television program in the virtual space 2.

In another aspect, the HMD system 100 may include a communication circuit for connecting to the Internet or have a verbal communication function for connecting to a telephone line.

Field-of-View Region

Figure 6:
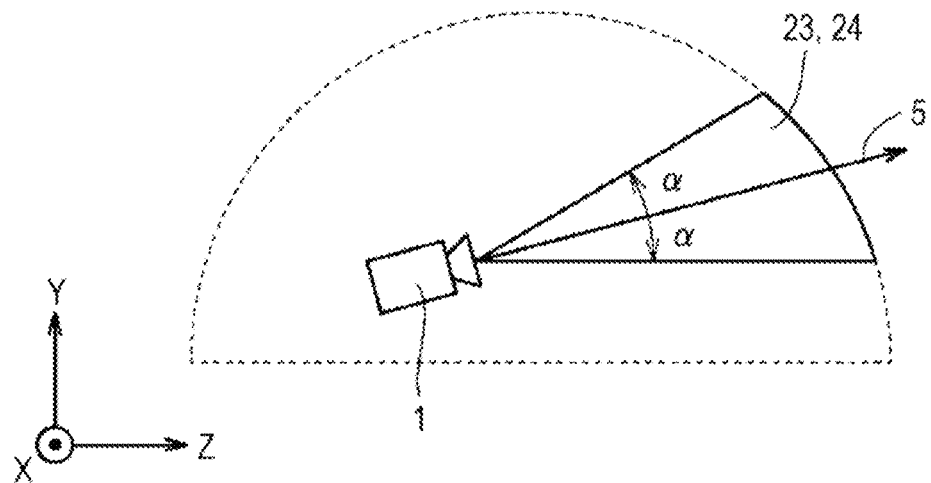
FIG. 6 is a diagram of a YZ cross section obtained by viewing a field-of-view region 23 from an X direction in the virtual space 2 according to at least one embodiment.
Figure 7:
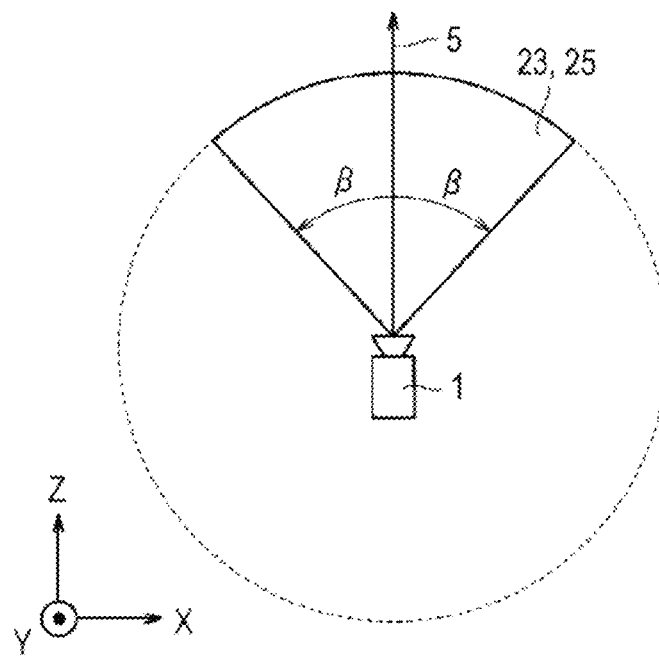
FIG. 7 is a diagram of an XZ cross section obtained by viewing the field-of-view region 23 from a Y direction in the virtual space 2 according to at least one embodiment.

With reference to FIG. 6 and FIG. 7, the field-of-view region 23 is described. FIG. 6 is a diagram of a YZ cross section obtained by viewing the field-of-view region 23 from an X direction in the virtual space 2 according to at least one embodiment. FIG. 7 is a diagram of an XZ cross section obtained by viewing the field-of-view region 23 from a Y direction in the virtual space 2 according to at least one embodiment.

In FIG. 6, the field-of-view region 23 in the YZ cross section includes a region 24. The region 24 is defined by the reference line of sight 5 of the virtual camera 1 and the YZ cross section of the virtual space 2. The processor 10 defines a range of a polar angle $\alpha$ from the reference line of sight 5 serving as the center in the virtual space 2 as the region 24.

In FIG. 7, the field-of-view region 23 in the XZ cross section includes a region 25. The region 25 is defined by the reference line of sight 5 and the XZ cross section of the virtual space 2. The processor 10 defines a range of an azimuth $\beta$ from the reference line of sight 5 serving as the center in the virtual space 2 as the region 25.

In one aspect, the HMD system 100 causes the monitor 112 to display a field-of-view image based on the signal from the computer 200, to thereby provide the virtual space to the user 190. The field-of-view image corresponds to a part of the virtual space image 22, which is superimposed on the field-of-view region 23. When the user 190 moves the HMD device 110 worn on his or her head, the virtual camera 1 is also moved in synchronization with the movement. As a result, the position of the field-of-view region 23 in the virtual space 2 is changed. With this, the field-of-view image displayed on the monitor 112 is updated to an image that is superimposed on the field-of-view region 23 of the virtual space image 22 in a direction in which the user faces in the virtual space 2. The user can visually recognize a desired direction in the virtual space 2.

While the user 190 is wearing the HMD device 110, the user 190 cannot visually recognize the real world but can visually recognize only the virtual space image 22 developed in the virtual space 2. Thus, the HMD system 100 can provide a high sense of immersion in the virtual space 2 to the user.

In one aspect, the processor 10 may move the virtual camera 1 in the virtual space 2 in synchronization with the movement in the real space of the user 190 wearing the HMD device 110. In this case, the processor 10 identifies the field-of-view region 23, which is an image region (that is, field-of-view region 23 in virtual space 2) to be projected on the monitor 112 of the HMD device 110, based on the position and the direction of the virtual camera 1 in the virtual space 2. That is, a visual field of the user 190 in the virtual space 2 is defined by the virtual camera 1.

According to at least one embodiment of this disclosure, the virtual camera 1 is desired to include two virtual cameras, that is, a virtual camera for providing a right-eye image and a virtual camera for providing a left-eye image. In at least one embodiment, an appropriate parallax be set for the two virtual cameras so that the user 190 can recognize the three-dimensional virtual space 2. In at least one embodiment, the virtual camera 1 includes two virtual cameras, and the roll directions of the two virtual cameras are synthesized so that the generated roll direction (w) is adapted to the roll direction (w) of the HMD device 110.

Controller

Figure 8A:
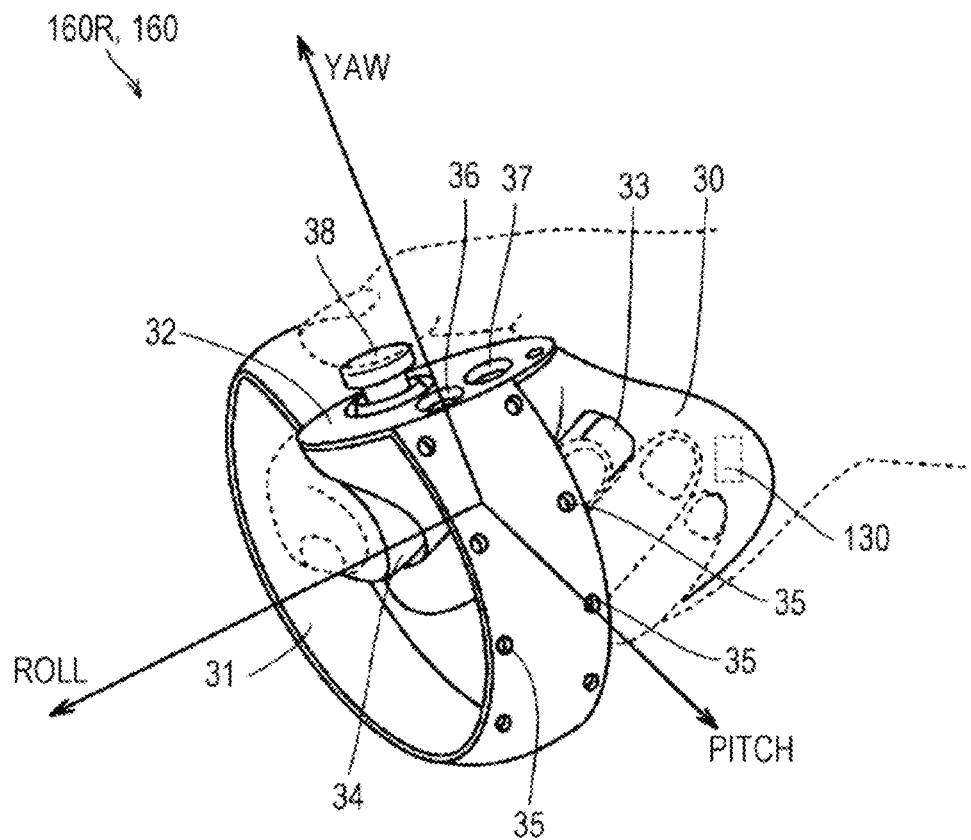
FIG. 8A is a diagram of a schematic configuration of a controller 160 of at least one embodiment of this disclosure.
Figure 8B:
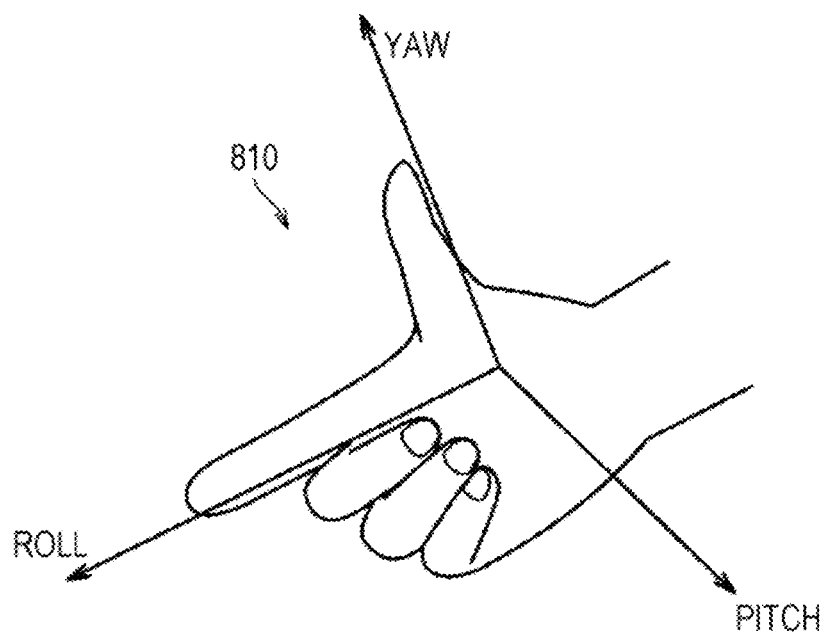
FIG. 8B is a diagram of a coordinate system for a hand of a user according to at least one embodiment.

An example of the controller 160 is described with reference to FIG. 8A and FIG. 8B. FIG. 8A i a diagram of a schematic configuration of the controller 160 of at least one embodiment of this disclosure. FIG. 8B is a diagram of a coordinate system for a user's hand according to at least one embodiment.

In FIG. 8A, in one aspect, the controller 160 may include a right controller 160R and a left controller. The right controller 160R is operated by the right hand of the user 190. The left controller is operated by the left hand of the user 190. In one aspect, the right controller 160R and the left controller are symmetrically configured as separate devices. Therefore, the user 190 can freely move his or her right hand holding the right controller 160R and his or her left hand holding the left controller. In another aspect, the controller 160 may be an integrated controller configured to receive an operation by both hands. The right controller 160R is now described.

The right controller 160R includes a grip 30, a frame 31, and a top surface 32. The grip 30 is configured so as to be held by the right hand of the user 190. For example, the grip 30 may be held by the palm and three fingers (middle finger, ring finger, and small finger) of the right hand of the user 190.

The grip 30 includes buttons 33 and 34 and the motion sensor 130. The button 33 is arranged on a side surface of the grip 30, and receives an operation performed by the middle finger of the right hand. The button 34 is arranged on a front surface of the grip 30, and receives an operation performed by the index finger of the right hand. In one aspect, the buttons 33 and 34 are configured as trigger type buttons. The motion sensor 130 is built into the casing of the grip 30. When a motion of the user 190 can be detected from the surroundings of the user 190 by a camera or another device, the grip 30 does not include the motion sensor 130 in at least one embodiment.

The frame 31 includes a plurality of infrared LEDs 35 arranged in a circumferential direction of the frame 31. The infrared LEDs 35 emit, during execution of a program using the controller 160, infrared rays in accordance with progress of that program. The infrared rays emitted from the infrared LEDs 35 may be used to detect the position, the posture (inclination and direction), and the like of each of the right controller 160R and the left controller. In FIG. 8A and FIG. 8B, the infrared LEDs 35 are shown as being arranged in two rows, but the number of arrangement rows is not limited to FIG. 8A and FIG. 8B. The infrared LEDs 35 may be arranged in one row or in three or more rows.

The top surface 32 includes buttons 36 and 37 and an analog stick 38. The buttons 36 and 37 are configured as push type buttons. The buttons 36 and 37 receive an operation performed by the thumb of the right hand of the user 190. In one aspect, the analog stick 38 receives an operation in any direction of 360 degrees from an initial position (neutral position). That operation includes, for example, an operation for moving an object arranged in the virtual space 2.

In one aspect, the right controller 160R and the left controller each include a battery for driving the infrared ray LEDs 35 and other members. The battery includes, for example, a rechargeable battery, a button battery, a dry battery, but the battery is not limited thereto. In another aspect, the right controller 160R and the left controller can be connected to a USB interface of the computer 200. In this case, each of the right controller 160R and the left controller does not need a battery.

In FIG. 8A and FIG. 8B, for example, respective directions of yaw, roll, and pitch are defined for a right hand 810 of the user 190. When the user 190 stretches the thumb and the index finger, a direction in which the thumb is stretched is defined as the yaw direction, a direction in which the index finger is stretched is defined as the roll direction, and a direction orthogonal to a plane defined by the axis of the yaw direction and the axis of the roll direction is defined as the pitch direction.

Control Device of HMD Device

Figure 9:
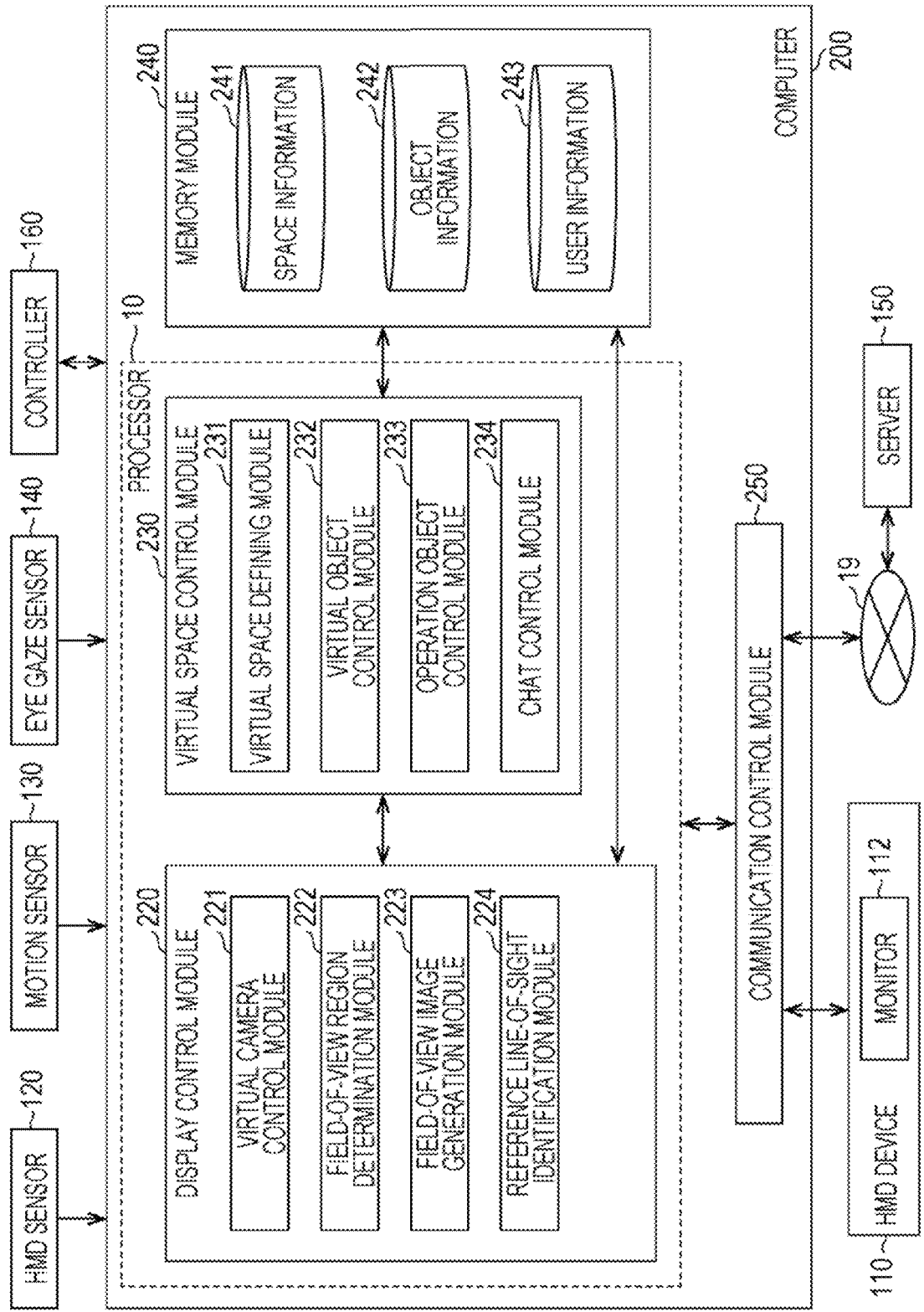
FIG. 9 is a block diagram of the computer 200 of at least one embodiment of this disclosure as a module configuration.

With reference to FIG. 9, the control device of the HMD device 110 is described. According to at least one embodiment of this disclosure, the control device is implemented by the computer 200 having a known configuration. FIG. 9 is a block diagram of the computer 200 of at least one embodiment of this disclosure as a module configuration.

In FIG. 9, the computer 200 includes a display control module 220, a virtual space control module 230, a memory module 240, and a communication control module 250. The display control module 220 includes, as sub-modules, a virtual camera control module 221, a field-of-view region determination module 222, a field-of-view image generation module 223, and a reference line-of-sight identification module 224. The virtual space control module 230 includes, as sub-modules, a virtual space defining module 231, a virtual object control module 232, an operation object control module 233, and a chat control module 234.

According to at least one embodiment of this disclosure, the display control module 220 and the virtual space control module 230 are implemented by the processor 10. According to at lest one embodiment of this disclosure, a plurality of processors 10 may actuate as the display control module 220 and the virtual space control module 230. The memory module 240 is implemented by the memory 11 or the storage 12. The communication control module 250 is implemented by the communication interface 14.

In one aspect, the display control module 220 controls the image display on the monitor 112 of the HMD device 110. The virtual camera control module 221 arranges the virtual camera 1 in the virtual space 2, and controls the behavior, the direction, and the like of the virtual camera 1. The field-of-view region determination module 222 defines the field-of-view region 23 in accordance with the direction of the head of the user wearing the HMD device 110. The field-of-view image generation module 223 generates the field-of-view image to be displayed on the monitor 112 based on the determined field-of-view region 23. The field-of-view image generation module 223 determines modes of display of player characters (described later in detail) contained in the field-of-view image. The reference line-of-sight identification module 224 identifies the line of sight of the user 190 based on the signal from the eye gaze sensor 140.

The virtual space control module 230 controls the virtual space 2 to be provided to the user 190. The virtual space defining module 231 generates virtual space data representing the virtual space 2 to define the virtual space 2 in the HMD system 100.

The virtual object control module 232 generates a target object to be arranged in the virtual space 2. The virtual object control module 232 controls actions (movement, change in state, and the like) of the target object and the player character in the virtual space 2. Examples of the target object may include forests, mountains, other landscapes, and animals to be arranged in accordance with the progress of the story of the game. The player character represents an object (so-called avatar) associated with the user wearing the HMD device 110 in the virtual space 2.

The operation object control module 233 arranges in the virtual space 2 an operation object for operating an object arranged in the virtual space 2. In one aspect, examples of the operation object may include a hand object corresponding to a hand of the user wearing the HMD device 110, a finger object corresponding to a finger of the user, and a stick object corresponding to a stick to be used by the user. When the operation object is a finger object, in particular, the operation object corresponds to a portion of an axis in the direction (axial direction) indicated by that finger.

The chat control module 234 performs control for enabling a chat with an avatar of another user staying in the same virtual space 2. For example, the chat control module 234 transmits information on, for example, the position and direction of an avatar of the user and voice information input to the microphone 118 to the server 150. The chat control module 234 outputs the voice data on another user received from the server 150 to a speaker (not shown). In this manner, a voice chat is implemented. The chat is not limited to the one that is based on voice data, but may be the one that is based on text data. In this case, the chat control module 234 controls transmission/reception of text data.

When any of the objects arranged in the virtual space 2 has collided with another object, the virtual space control module 230 detects that collision. The virtual space control module 230 can detect, for example, the timing of a given object touching another object, and performs processing determined in advance when the timing is detected. The virtual space control module 230 can detect the timing at which objects that are touching separate from each other, and performs processing determined in advance when the timing is detected. The virtual space control module 230 can also detect a state in which objects are touching. Specifically, when the operation object and another object are touching, the operation object control module 233 detects that the operation object and the other object have touched, and performs processing determined in advance.

The memory module 240 stores data to be used for providing the virtual space 2 to the user 190 by the computer 200. In one aspect, the memory module 240 stores space information 241, object information 242, and user information 243. The space information 241 stores one or more templates defined in order to provide the virtual space 2. The object information 242 includes, for example, content to be played in the virtual space 2 and information for arranging an object to be used in the content in the virtual space 2. Examples of the content may include a game and content representing a landscape similar to that of the real world. The user information 243 includes, for example, a program for causing the computer 200 to function as the control device of the HMD system 100 and an application program that uses each piece of content stored in the object information 242.

The data and programs stored in the memory module 240 are input by the user of the HMD device 110. Alternatively, the processor 10 downloads the programs or data from a computer (e.g., server 150) that is managed by a business operator providing the content, and stores the downloaded programs or data in the memory module 240.

The communication control module 250 may communicate to/from the server 150 or other information communication devices via the network 19.

In one aspect, the display control module 220 and the virtual space control module 230 may be implemented with use of, for example, Unity (R) provided by Unity Technologies. In another aspect, the display control module 220 and the virtual space control module 230 may also be implemented by combining circuit elements for implementing each step of processing.

The processing in the computer 200 is implemented by hardware and software executed by the processor 10. The software may be stored in advance on a hard disk or other memory module 240. The software may also be stored on a compact disc read-only memory (CD-ROM) or another computer-readable non-volatile data recording medium, and distributed as a program product. The software may also be provided as a program product that can be downloaded by an information provider connected to the Internet or another network. Such software is read from the data recording medium by an optical disc drive device or another data reading device, or is downloaded from the server 150 or another computer via the communication control module 250 and then temporarily stored in the memory module 240. The software is read from the memory module 240 by the processor 10, and is stored in a RAM in a format of an executable program. The processor 10 executes that program.

The hardware constructing the computer 200 in FIG. 9 is common hardware. Therefore, at least one embodiment includes the program stored in the computer 200. The operations of the hardware of the computer 200 are known, and hence a detailed description thereof is omitted here.

The data recording medium is not limited to a CD-ROM, a flexible disk (FD), and a hard disk. The data recording medium may also be a non-volatile data recording medium configured to store a program in a fixed manner, for example, a magnetic tape, a cassette tape, an optical disc (magnetic optical (MO) disc, mini disc (MD), or digital versatile disc (DVD)), an integrated circuit (IC) card (including a memory card), an optical card, and semiconductor memories such as a mask ROM, an erasable programmable read-only memory (EPROM), an electrically erasable programmable read-only memory (EEPROM), and a flash ROM.

The program herein does not only include a program that can be directly executed by the processor 10. The program may also include a program in a source program format, a compressed program, or an encrypted program, for example.

Control Structure

Figure 10:
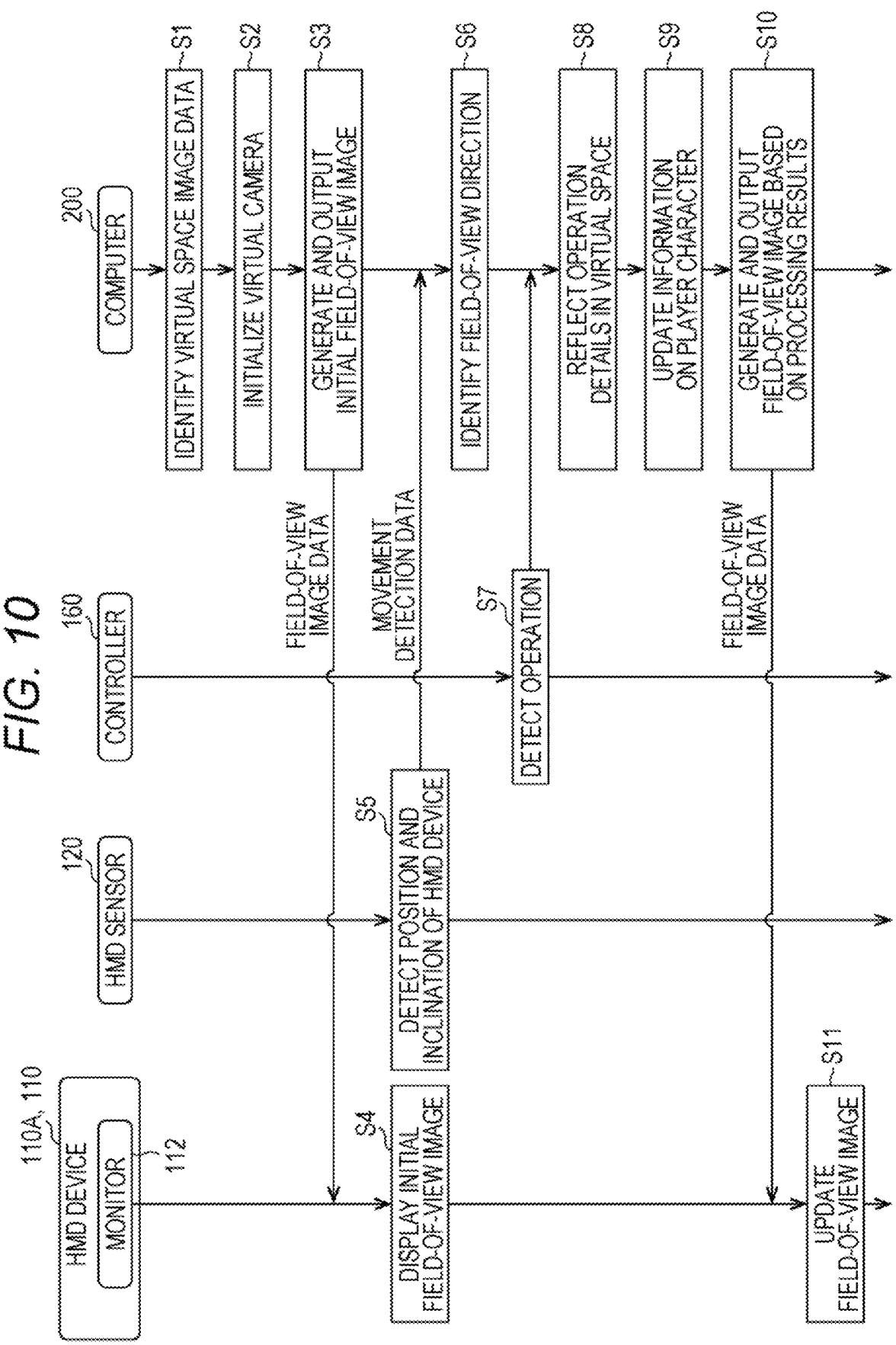
FIG. 10 is a flowchart of processing executed by an HMD system 100A according to at least one embodiment.

The control structure of the computer 200 of at least one embodiment is now described with reference to FIG. 10. FIG. 10 is a flowchart of processing to be executed by the HMD system 100A used by a user 190A (first user) in order to provide the user 190A with the virtual space 2 according to at least one embodiment.

In Step S1, the processor 10 of the computer 200 serves as the virtual space defining module 231 to identify the virtual space image data and define the virtual space 2.

In Step S2, the processor 10 serves as the virtual camera control module 221 to initialize the virtual camera 1. For example, in a work area of the memory, the processor 10 arranges the virtual camera 1 at the center point defined in advance in the virtual space 2, and matches the line of sight of the virtual camera 1 with the direction in which the user 190 is facing in the virtual space 2.

In Step S3, the processor 10 serves as the field-of-view image generation module 223 to generate field-of-view image data for displaying an initial field-of-view image. The generated field-of-view image data is transmitted to the HMD device 110 by the communication control module 250 via the field-of-view image generation module 223.

In Step S4, the monitor 112 of the HMD device 110 displays the field-of-view image based on the signal received from the computer 200. The user 190 wearing the HMD device 110 may recognize the virtual space 2 through visual recognition of the field-of-view image.

In Step S5, the HMD sensor 120 detects the inclination of the HMD device 110 based on a plurality of infrared rays emitted from the HMD device 110. The detection result is transmitted to the computer 200 as movement detection data.

In Step S6, the processor 10 serves as the field-of-view region determination module 222 to identify a field-of-view direction of the user 190 wearing the HMD device 110 based on the position and the inclination of the HMD device 110. The processor 10 executes an application program to arrange the objects in the virtual space 2 based on an instruction included in the application program.

In Step S7, the controller 160 detects an operation performed by the user 190 in the real space. For example, in one aspect, the controller 160 detects the fact that the button has been pressed by the user 190. In another aspect, the controller 160 detects the movement of both hands of the user 190 (e.g., waving both hands). The detection signal representing the details of detection is transmitted to the computer 200.

In Step S8, the processor 10 serves as the operation object control module 233 to reflect the detection details transmitted from the controller 160 in the virtual space 2. Specifically, the processor 10 moves an operation object (e.g., hand object representing hand of player character) in the virtual space 2 based on a signal representing the detection details. The processor 10 serves as the operation object control module 233 to detect an operation (e.g., grasping operation) determined in advance and performed on the target object by the operation object.

In Step S9, the processor 10 updates information on player characters associated with other users 190B and 190C based on information (player information described later) transmitted from the HMD systems 100B and 100C used by the other users (second users). Specifically, the processor 10 serves as the virtual object control module 232 to update information on, for example, the position and direction of the player characters associated with the other users in the virtual space 2.

In Step S10, the processor 10 serves as the field-of-view image generation module 223 to generate field-of-view image data for representing a field-of-view image that is based on the results of processing in Step S8 and Step S9, and outputs the generated field-of-view image data to the HMD device 110. When the processor 10 generates the field-of-view image data, the processor 10 determines modes of display of player characters contained in the field-of-view image. Whether or not player characters are contained in the field-of-view image is determined depending on, for example, whether or not the field-of-view region 23 determined based on the field-of-view direction identified in Step S6 contains player characters.

In Step S11, the monitor 112 of the HMD device 110 updates the field-of-view image based on the received field-of-view image data, and displays the updated field-of-view image.

Figure 11:
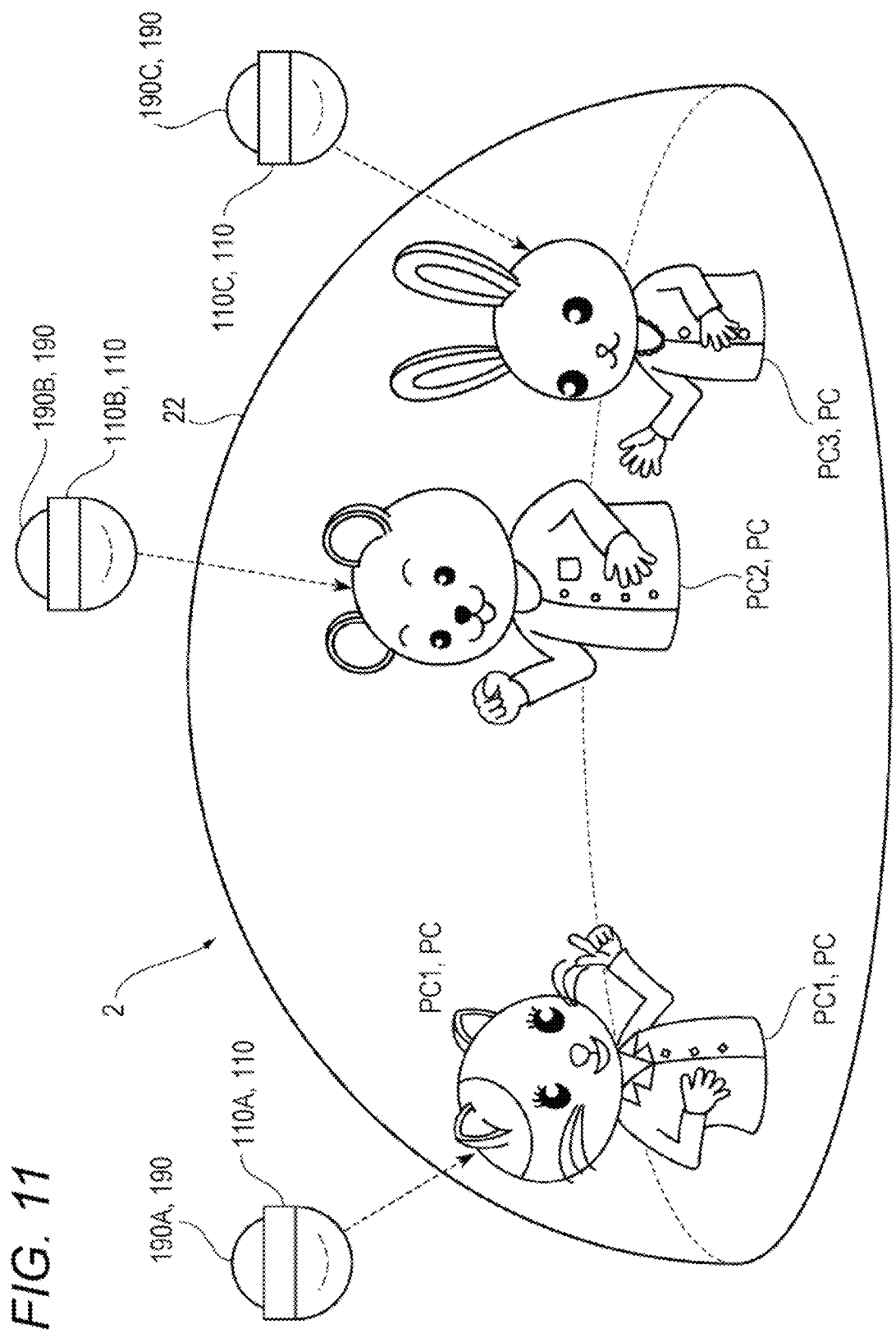
FIG. 11 is a diagram of the virtual space 2 shared by a plurality of users according to at least one embodiment.

FIG. 11 is a diagram of the virtual space 2 shared by a plurality of users according to at least one embodiment. In FIG. 11, a player character PC1 (first player character) associated with the user 190A wearing the HMD device 110A, a player character PC2 (second player character) associated with the user 190B wearing the HMD device 110B, a player character PC3 (second player character) associated with the user 190C wearing the HMD device 110C are arranged in the same virtual space 2. With the virtual space 2 shared by the plurality of users, each user is provided with a communication experience, for example, a chat (VR chat) with other users via the player characters PC.

Each player character PC is defined as an object simulating an animal (cat, rabbit, or bear). The player character PC is formed of a head part that moves in synchronization with movement of the HMD device 110 detected by, for example, the HMD sensor 120, a hand part that moves in synchronization with movement of a hand of the user detected by, for example, the motion sensor 130, a body part and arm part that are displayed in connection with the head part and hand part. Control of movement is complicated for a leg part that is below a hip, and thus the player character PC does not include a leg part.

Figure 12:
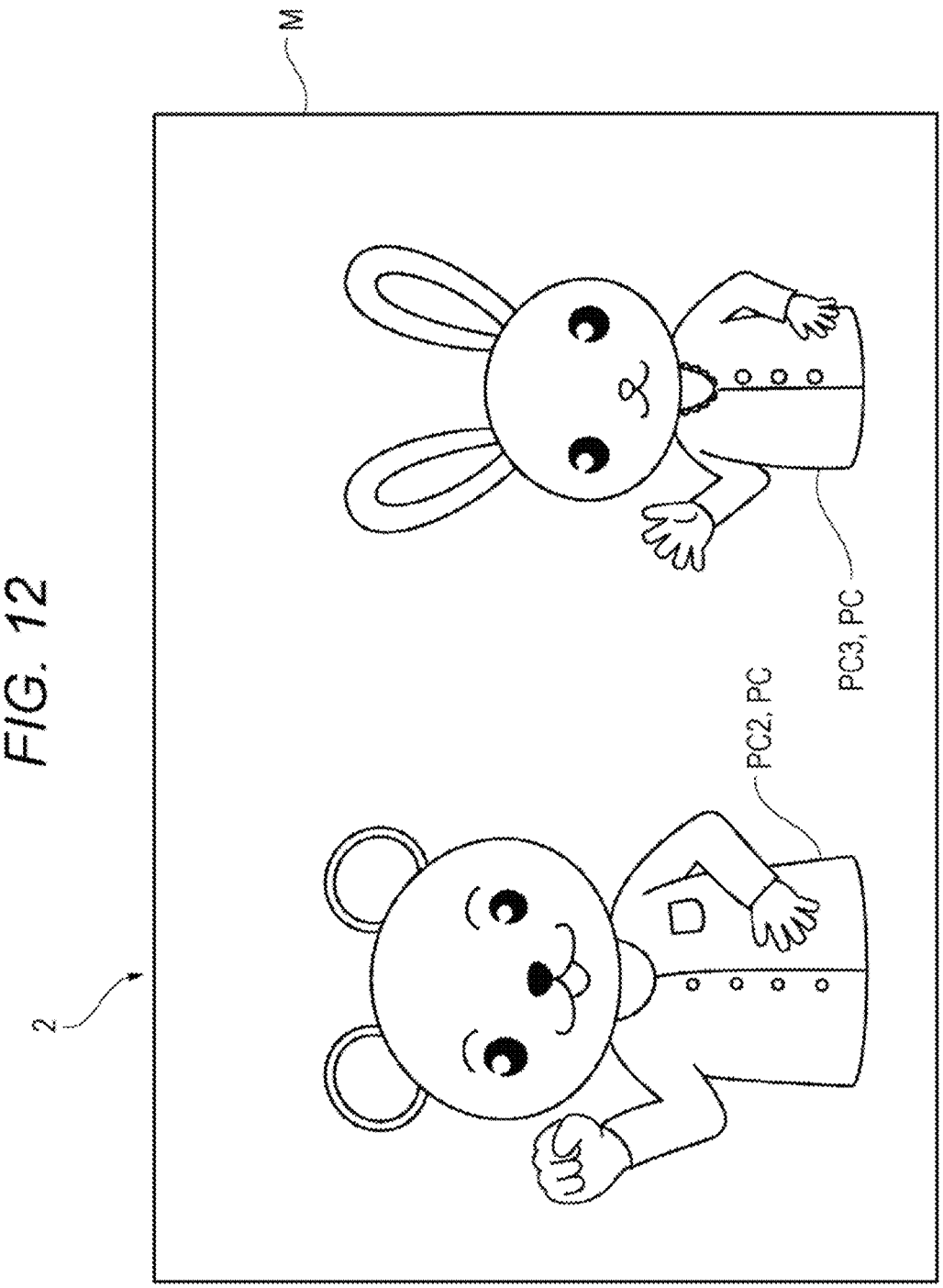
FIG. 12 is a diagram of a field-of-view image M provided to a user 190A according to at least one embodiment.

The field of view of the player character PC1 is the same as the field of view of the virtual camera 1 in the HMD system 100A. Thus, the user 190A is provided with a field-of-view image M from the first-person point of view of the player character PC1. That is, the user 190A is provided with a virtual experience as if the user 190A himself or herself were in the virtual space 2 as the player character PC1. FIG. 12 is a diagram of the field-of-view image M provided to the user 190A via the HMD device 110A according to at least one embodiment. The users 190B and 190C are also provided with the field-of-view images from the first-person points of view of the player characters PC2 and PC3 as well.

Figure 13:
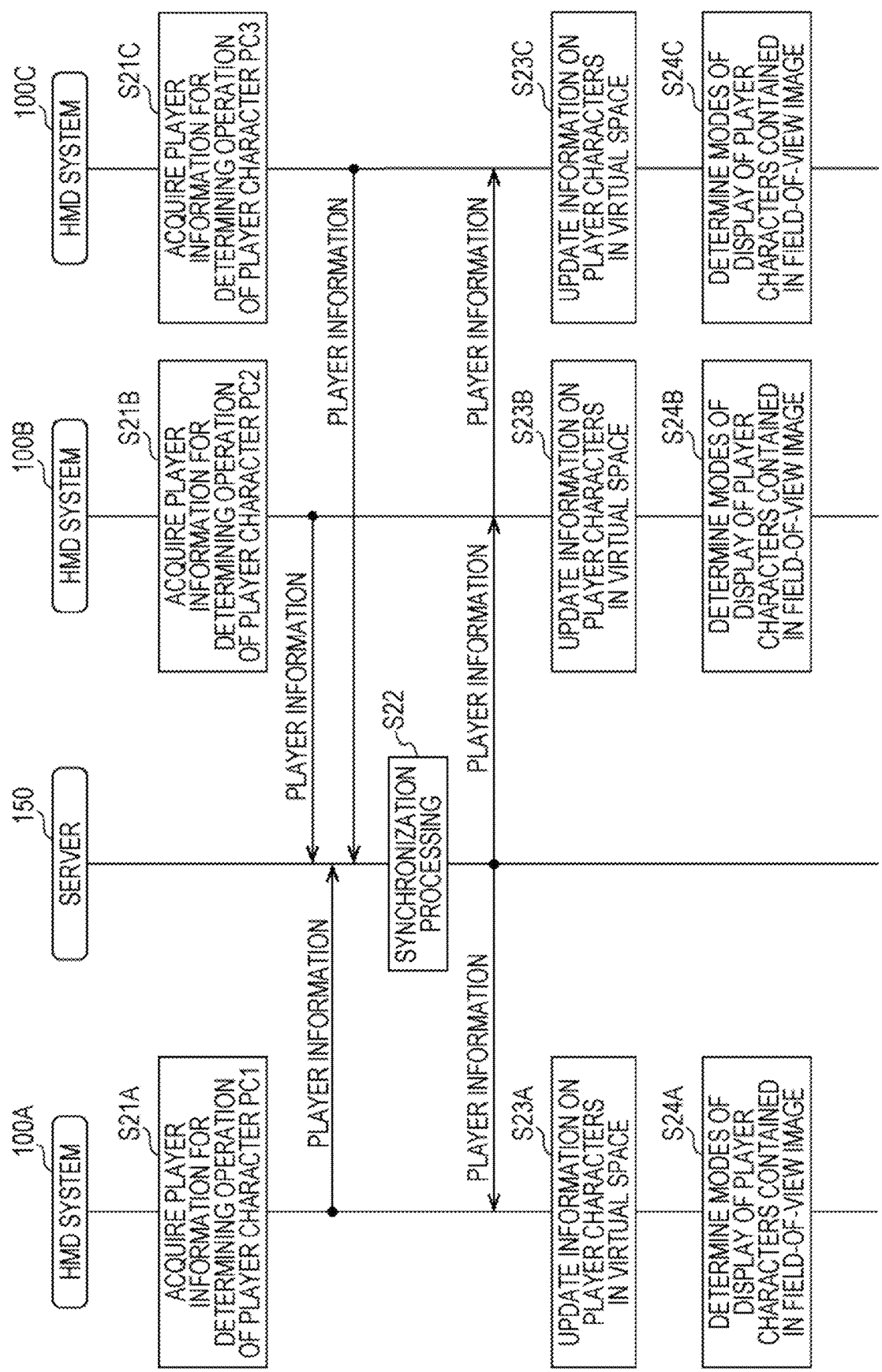
FIG. 13 is a sequence diagram of processing to be executed by an HMD system 100A, an HMD system 100B, an HMD system 100C, and a server 150 according to at least one embodiment.

FIG. 13 is a sequence diagram of processing to be executed by the HMD system 100A, the HMD system 100B, the HMD system 100C, and the server 150 in order to implement the VR chat described above according to at least one embodiment.

In Step S21A, the processor 10 in the HMD system 100A serves as the chat control module 234 to acquire player information for determining movement of the player character PC1 in the virtual space 2. This player information contains, for example, movement information, face tracking data, voice data, and emotion data. The movement information contains, for example, information representing a temporal change in position and inclination of the HMD device 110A detected by, for example, the HMD sensor 120, and information representing movement of the hand of the user 190A detected by, for example, the motion sensor 130. The face tracking data is data for identifying the position and size of each part of the face of the user 190A. The face tracking data is generated by image analysis processing conducted on image information acquired by the camera 116 of the HMD device 110A, for example. The voice data is data representing the voice of the user 190A acquired by the microphone 118 of the HMD device 110A. The emotion data is information representing the emotion of the user 190A, and for example, is information containing an emotion type (e.g., happiness, anger, or sadness) and an emotion degree (e.g., represented by 10 levels). For example, the processor 10 generates emotion data by certain emotion recognition processing using the face tracking data or voice data. The player information may contain, for example, information (e.g., user ID) identifying the player character PC1 (or user 190A associated with player character PC1) and information (e.g., room ID) identifying the virtual space 2 containing the player character PC1. The processor 10 transmits the player information acquired as described above to the server 150 via the network 19.

In Step S21B, similarly to the processing in Step 21A, the processor 10 in the HMD system 100B acquires player information for determining movement of the player character PC2 in the virtual space 2, and transmits the player information to the server 150. Similarly, in Step S21C, the processor 10 in the HMD system 100C acquires player information for determining movement of the player character PC3 in the virtual space 2, and transmits the player information to the server 150.

In Step S22, the server 150 temporarily stores the player information received from each of the HMD system 100A, the HMD system 100B, and the HMD system 100C. The server 150 integrates the player information of all the users (in this example, users 190A to 190C) associated with the shared virtual space 2 based on, for example, the user ID and the room ID contained in each player information. Then, the server 150 transmits the integrated player information to all the users associated with the virtual space 2 at a predetermined timing. In this manner, synchronization processing is executed. With such synchronization processing, the HMD system 100A, the HMD system 100B, and the HMD system 100C can share mutual player information at substantially the same timing.

The HMD systems 100A to 100C execute processing of Step S23A to Step S23C, respectively, based on the player information transmitted to the HMD systems 100A to 100C from the server 150. The processing of Step S23A corresponds to processing of Step S9 in FIG. 10.

In Step S23A, the processor 10 in the HMD system 100A serves as the virtual object control module 232 to update information on the player characters PC2 and PC3 of the other users 190B and 190C in the virtual space 2. Specifically, the processor 10 updates, for example, the position and direction of the player character PC2 in the virtual space 2 based on the movement information contained in the player information transmitted from the HMD system 100B. For example, the processor 10 updates the information (e.g., position and direction) on the player character PC2 contained in the object information 242 stored in the memory module 240. Similarly, the processor 10 updates the information (e.g., position and direction) of the player character PC3 in the virtual space 2 based on the movement information contained in the player information transmitted from the HMD system 100C.

In Step S23B, similarly to the processing in Step 23A, the processor 10 in the HMD system 100B updates information on the player characters PC1 and PC3 of the users 190A and 190C in the virtual space 2. Similarly, in Step S23C, the processor 10 in the HMD system 100C updates information on the player characters PC1 and PC2 of the users 190A and 190B in the virtual space 2.

The HMD systems 100A to 100C execute processing of Step S24A to Step S24C, respectively. The processing of Step S24A corresponds to a part of the processing of Step S10 in FIG. 10.

In Step S24A, the processor 10 in the HMD system 100A serves as the field-of-view image generation module 223 to determine modes of display of the player characters PC contained in the field-of-view image M. Specifically, the processor 10 extracts the player characters PC contained in the field-of-view region 23, which is determined based on the field-of-view direction of the virtual camera 1 (player character PC1). In FIG. 11 and FIG. 12, the field-of-view region of the virtual camera 1 in the HMD system 100A contains the player characters PC2 and PC3. Thus, the processor 10 extracts the player characters PC2 and PC3 as the player characters PC contained in the field-of-view image M, and determines the modes of display of the player characters PC2 and PC3.

Processing of Step S24B and Step S24C in the HMD systems 100B and 100C is similar to the processing of Step S24A in the HMD system 100A. Processing of determining the mode of display of the player character PC3 in Step S24A is similar to processing of determining the mode of display of the player character PC2. Thus, in the following, a description is given in detail of only the processing of determining the mode of display of the player character PC2 in Step S24A.

For example, the processor 10 in the HMD system 100A may generate movement data defining movement of the face part of the player character PC2 based on the face tracking data on the user 190B received as the player information. With this movement data, the facial expression of the player character PC2 contained in the field-of-view image M is changed. For example, the processor 10 may generate an image representing the position and shape of each part of the face of the player character PC2 based on the position and shape of each part of the face of the user 190B represented by the face tracking data. Then, the processor 10 may determine the image as the face image of the player character PC2. With this, the change in facial expression of the user 190B participating in a VR chat can be reflected as the facial expression of the player character PC2 in the virtual space 2. As a result, emotional understanding among the users in the virtual space 2 may be improved.

The memory module 240 of the HMD system 100A may hold in advance a plurality of facial expression images (e.g., image corresponding to surprise and image corresponding to sadness) corresponding to a plurality of facial expressions of the player character PC2 as the object information 242. In this case, the processor 10 may determine, as the face image of the player character PC2, a facial expression image corresponding to the emotion type and emotion degree represented by the emotion data of the user 190B received as the player information. With this, the face tracking data does not need to be used to represent the facial expression of the player character PC2 in the field-of-view image M, and thus the data communication amount may be reduced by eliminating communication of the face tracking data. The processing necessary for representing the facial expression of the player character PC2 is reduced to processing of simply extracting an image corresponding to the emotion data from among the plurality of facial expression images prepared in advance. Therefore, the processing amount is reduced and the processing is sped up.

When the facial expression of the player character PC2 is switched from one facial expression to another among the plurality of facial expression images prepared in advance as described above, the processor 10 may execute so-called morphing processing. Morphing is processing of interpolating a video image in an intermediate state of two different states (in this case, two different states of facial expression) by a computer. For example, the processor 10 may prepare a facial expression image (e.g., facial expression image representing surprise) of the player character PC2 corresponding to emotion data on the user 190B received in the previous synchronization processing and a facial expression image (e.g., facial expression image representing happiness) of the player character PC2 corresponding to emotion data on the user 190B received in the current synchronization processing, and use morphing to generate a video image (movement data) in an intermediate state of those two facial expression images. With the video image in an intermediate state generated in this manner, a natural change in facial expression of the player character PC2 on the field-of-view image M is provided to the user 190A. Specifically, the processor 10 may output, as part of the field-of-view image data, the video image in an intermediate state generated in this manner to the HMD device 110A as well as the facial expression image of the player character PC2 corresponding to the emotion data on the user 190B received in the current synchronization processing. With this, a natural change in facial expression of the player character PC2 on the field-of-view image M is provided to the user 190A. As a result, the user 190A can be provided with a higher sense of immersion into the virtual space 2.

The processor 10 in the HMD system 100A may serve as the chat control module 234 to output voice data contained in the player information to, for example, a speaker, in parallel to the processing in Step S24A. Specifically, the processor 10 may output the voice data in synchronization with movement of the player character PC2. In this case, the user 190A can grasp details of utterance by the user 190B as details of utterance by the player character PC2. With this, the user 190A can be provided with a higher sense of immersion into the virtual space 2.

With the processing of Step S24A as described above, the user 190A is provided with the field-of-view image M that has reflected, for example, the movements and facial expressions of the other users 190B and 190C in the player characters PC2 and PC3. Similarly, through the processing of Step S24B and Step S24C, the users 190B and 190C are provided with similar field-of-view images.

Transparent Display of Player Character

The VR chat described above may be applied to, for example, viewing of the same 360-degree panorama video by a plurality of users. An example of the 360-degree panorama video is, for example, a video in which a natural scenery of, for example, a forest, is displayed as the virtual space image 22. In such a case, when there are a large number of users viewing the 360-degree panorama video at the same time (namely, number of users sharing virtual space 2), the avatar associated with one user may block the field of view of another user in the virtual space 2, resulting in a difficulty in viewing the 360-degree panorama video. To address this problem, the processor 10 in the HMD system 100A sets transparency rates of the player characters PC as part of processing of determining the modes of display of the player characters PC contained in the field-of-view image M. That is, the processor 10 executes processing (transparency control) of performing transparent display of a part or all of the player characters PC as described below. In the following, a description is given of first to third examples of the transparency control of the player characters PC.

Figure 14:
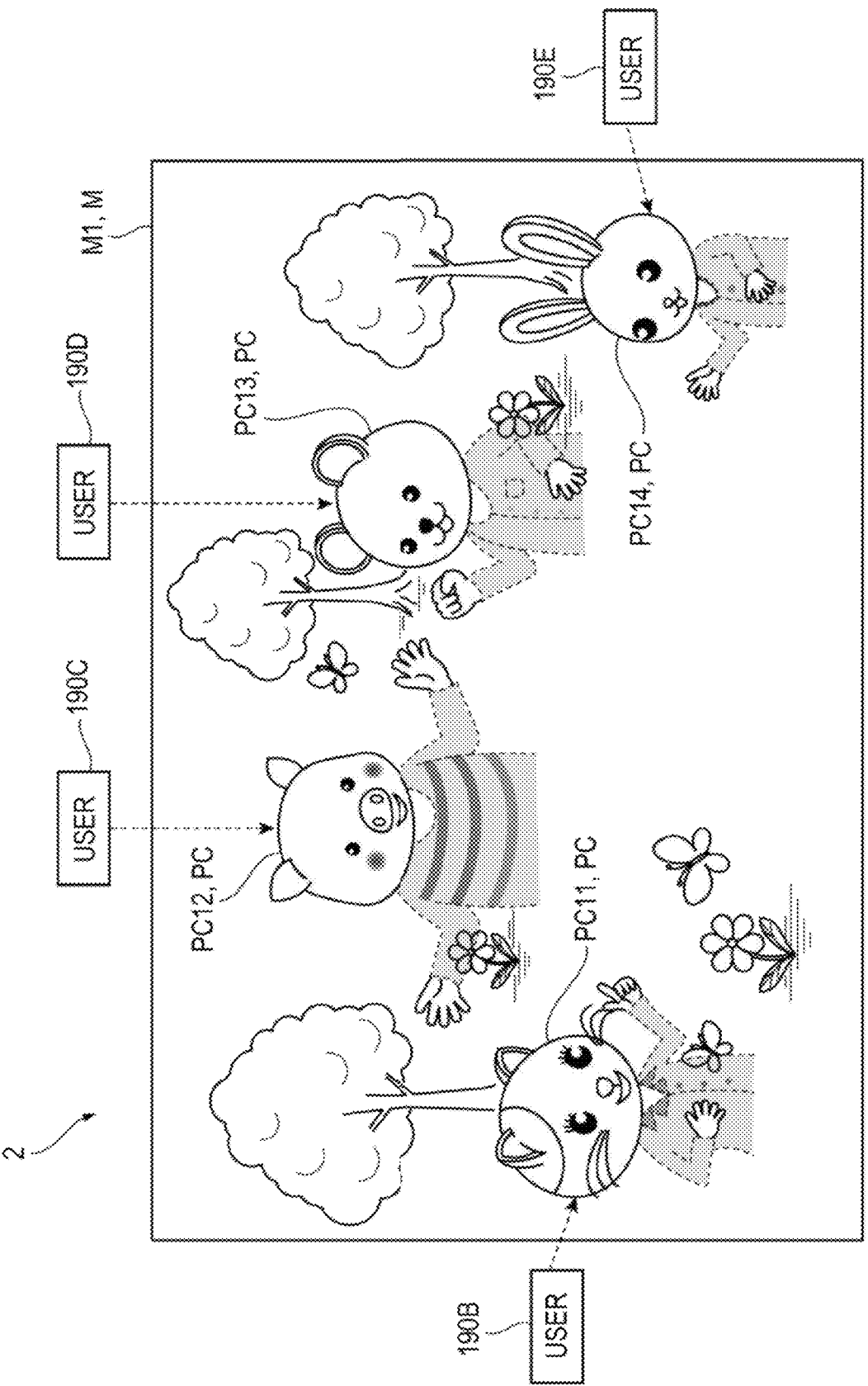
FIG. 14 is a diagram of a field-of-view image (field-of-view image M1) including transparency control of a player character according to at least one embodiment.

FIG. 14 is a diagram of a field-of-view image (field-of-view image M1) including transparency control of the player characters PC according to at least one embodiment. The field-of-view image M1 is an image provided to the user 190A (first user), who uses the HMD system 100A, via the HMD device 110A. That is, the field-of-view image M1 is a field-of-view image from the first-person point of view of the player character PC (first player character) associated with the user 190A. Four player characters PC11 to PC14 (second player characters) contained in the field-of-view image M1 are the player characters PC associated with the other users 190B to 190E (second users) for the user 190A. That is, in FIG. 14, five player characters PC associated with five users 190A to 190E are arranged in the shared virtual space 2.

The player characters PC11 to PC14 each include a first part whose movement is controlled in the virtual space 2 in synchronization with movement of each of the users 190B to 190E and a second part that is displayed in connection with the first part. In at least one embodiment, the first part is a head part and a hand part. As described above, the head part of the player character PC is a part whose movement is controlled in the virtual space 2 in synchronization with movement of the HMD device 110. The hand of the player character PC is a part whose movement is controlled in the virtual space 2 in synchronization with movement of the hand of the user. On the other hand, the second part is a body part (part above hip) and an arm part that are displayed in connection with the head part and the hand part. The arm part is a part that connects the body part to the hand. However, the first part and the second part are not limited to the example described above. For example, the arm part may be contained in the first part similarly to the hand part, or may not be contained as part of the player character PC in the first place. Information representing which part of each player character PC is the first part or the second part is stored in the memory module 240 in advance as the object information 242, for example. In this case, the processor 10 can refer to the object information 242 to identify the first part and second part of each player character PC.

In at least one embodiment, the processor 10 serves as the field-of-view image generation module 223 to execute the following processing in the processing of determining the mode of display described above (processing corresponding to Step S10 in FIG. 10 and processing corresponding to Step S24A in FIG. 13). Specifically, the processor 10 sets the transparency rates of the first part and the second part so that the transparency rate (degree of transparency) of at least a portion of the second part is larger than the transparency rate of the first part for each of the player characters PC11 to PC14 contained in the field-of-view image M1. The transparency rate is set within a range of from 0% (non-transparent) to 100% (completely transparent).

In this description, as an example, the processor 10 sets the transparency rate of the first part (head part and hand part) to 0% for each of the player characters PC11 to PC14. However, the transparency rate of the first part may be set to a value larger than 0%. On the other hand, the processor 10 sets the transparency rate of the second part (body part and arm part) for each of the player characters PC11 to PC14 so that the transparency is larger than the transparency rate (0%) of the first part and smaller than 100%. The user is able to recognize presence of the whole body of each player character while avoiding interfering with viewing of the same 360-degree panorama video by the user by causing the transparency rate of the first part to be smaller than 100%. The processor 10 sets the transparency rate of the second part so that the entire transparency rate of the second part becomes constant.

The processor 10 (field-of-view image generation module 223) generates and outputs field-of-view image data to which the transparency rate is set as described above, to thereby provide the user 190A with the field-of-view image M1 in FIG. 14 via the HMD device 110A. The first part (head part and hand part) that moves in synchronization with movement of each of the users 190B to 190E is displayed on the field-of-view image M1 more clearly than the second part (body part and arm part). With this, the user 190A is able to easily recognize, for example, the facial expressions and gestures of the player characters PC11 to PC14 and facilitate communication among the users. The user 190A can feel the sense (e.g., sense of unity) of sharing the same virtual space 2 with the other users 190B to 190E. As a result, the entertainment value of virtual experiences in which the plurality of users share the virtual space is maintained.

On the other hand, the second part (body part and arm part), which is displayed in connection with the first part, is displayed in a translucent manner on the field-of-view image M1. With this, visibility of the 360-degree panorama video by the user 190A in the virtual space 2 is improved. The second part is not displayed in a completely transparent manner (not hidden) on the field-of-view image M1, and thus an unnatural situation in which the player characters PC11 to PC14 do not have their bodies (that is, situation in which only the head part is floating in the air) can be prevented. In short, natural avatar representation is implemented. With this, reducing the sense of immersion into the virtual experience by the user 190A is minimized or avoided.

Figure 15:
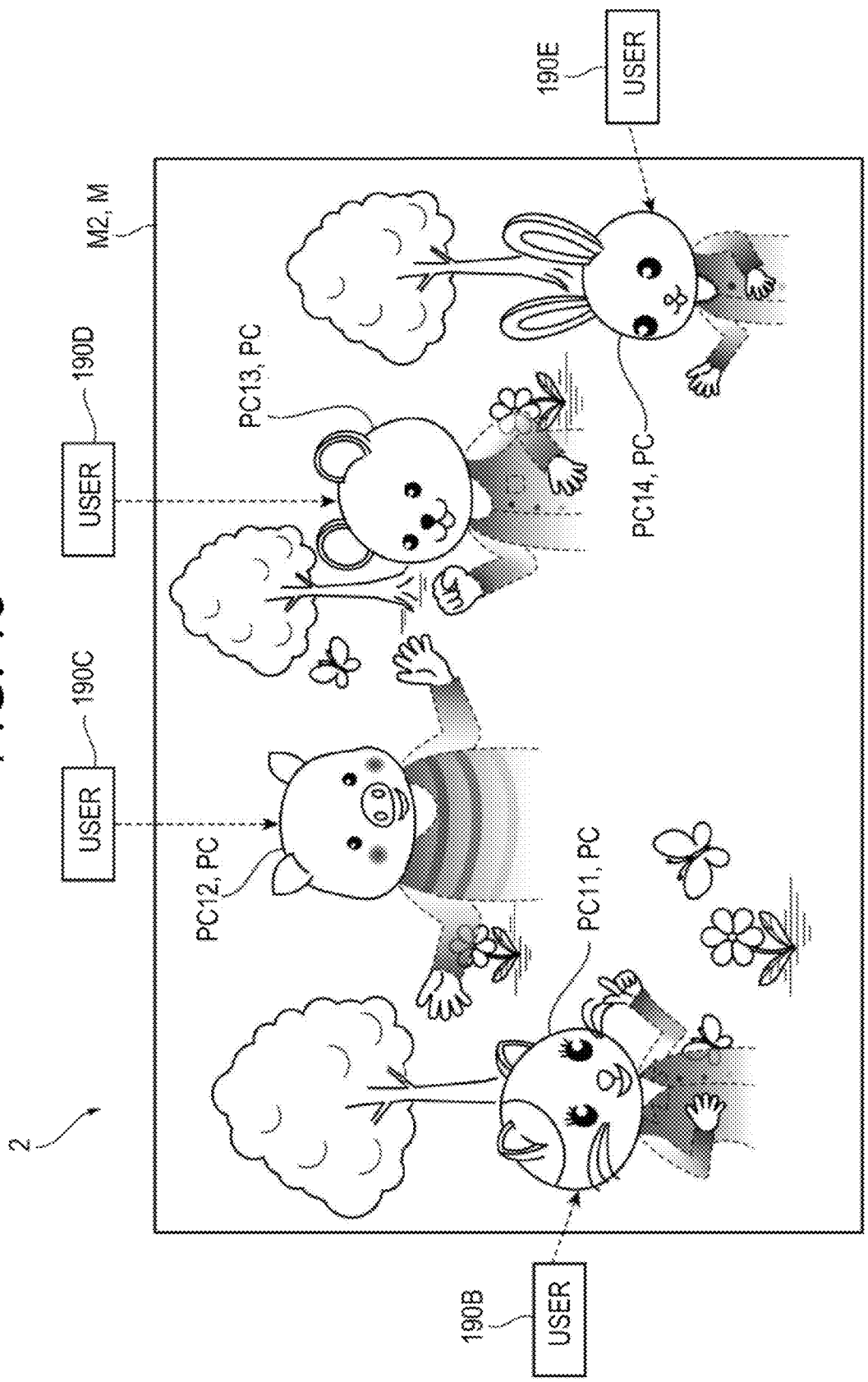
FIG. 15 is a diagram of a field-of-view image (field-of-view image M2) including transparency control of a player character according to at least one embodiment.

FIG. 15 is a diagram of a field-of-view image (field-of-view image M2) including transparency control of the player characters PC according to at least one embodiment. FIG. 15 is different from FIG. 14 in that the transparency rate of transparency of a position in the second part is set to become larger gradually as the position becomes further away from the first part for each of the player characters PC11 to PC14 contained in the field-of-view image M2, and the IFG. 15 is similar to FIG. 14 in other points. In this description, for example, the processor 10 sets the transparency rate of a position in the arm part to become larger gradually as the position becomes further away from the hand part. Similarly, the processor 10 sets the transparency rate of a position in the body part to become larger gradually as the position becomes further away from the head part.

The field-of-view image M2 in FIG. 15 is provided to the user 190A via the HMD device 110A by the processor 10 (field-of-view image generation module 223) generating and outputting the field-of-view image data to which the transparency rate is set as described above. The transparency rate of a position in the second part is raised gradually as the position becomes further away from the first part on the field-of-view image M2. In this manner, a sense of strangeness felt by the user 190A is reduced, which is caused by transparent display of the player characters PC11 to PC14, by gradation representation in which the transparency rate gradually changes.

Figure 16:
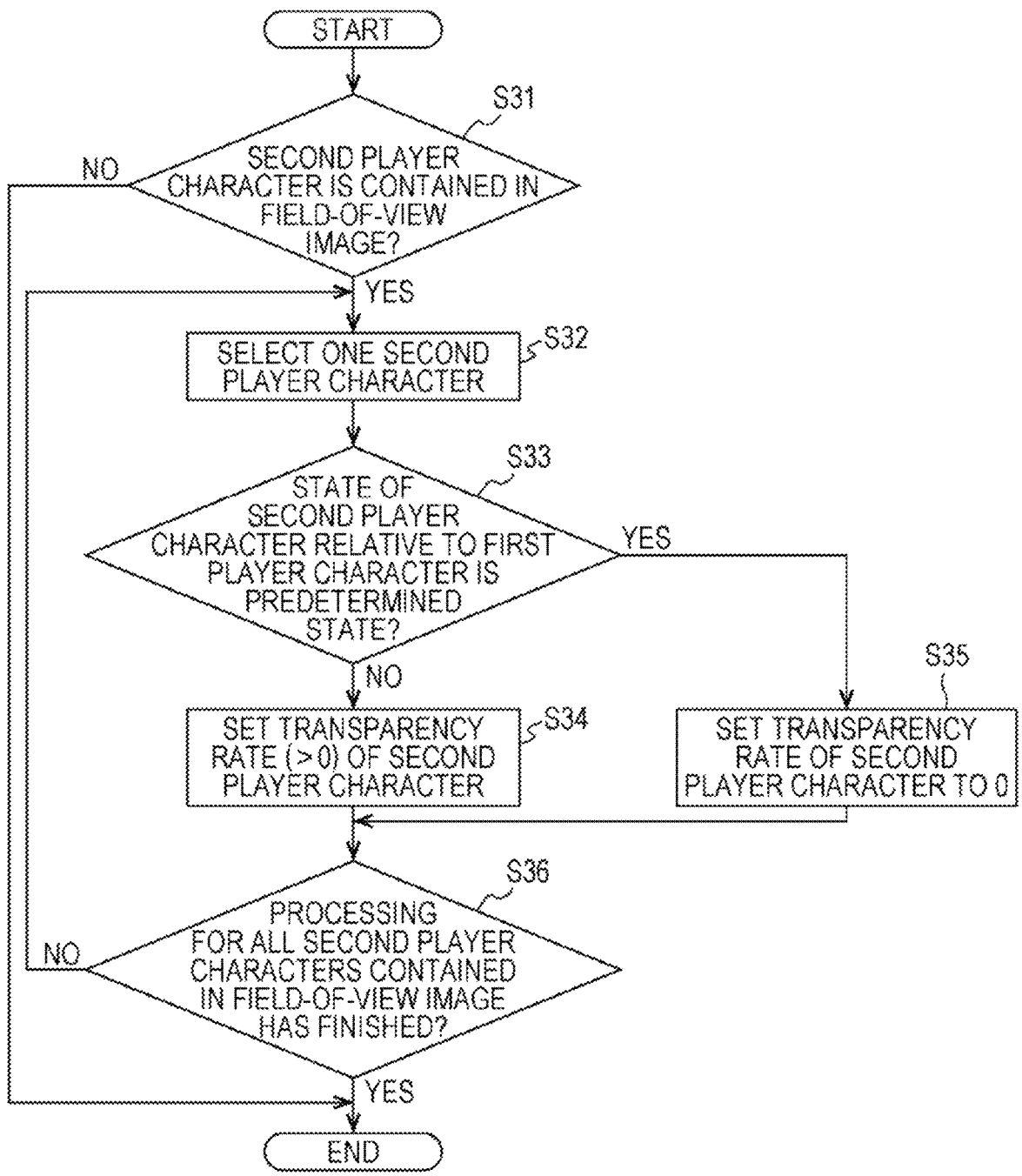
FIG. 16 is a flowchart of processing to be executed by the HMD system 100A including transparency control of a player character according to at least one embodiment.

In at least one embodiment, the processor 10 (field-of-view image generation module 223) sets the transparency rate for each of the player characters PC11 to PC14 depending on the state of each of the player characters PC11 to PC14 (second player characters) associated with the users 190B to 190E (second users) relative to the player character PC (first player character) associated with the user 190A. Specifically, in the processing of determining the mode of display described above (processing corresponding to Step S10 of FIG. 10 and processing corresponding to Step S24A of FIG. 13), the processor 10 serves as the field-of-view image generation module 223 to execute processing in FIG. 16. FIG. 16 is a flowchart of processing to be executed by the HMD system 100A including transparency control of a player character according to at least one embodiment.

In Step S31, the processor 10 determines whether or not the field-of-view image contains a second player character. When the field-of-view image does not contain a second player character, the processor 10 ends the processing of the transparency control in the third example. On the other hand, when the field-of-view image contains one or more second player characters, the processor 10 executes the processing of Step S32.

In Step S32 to Step S36, the processor 10 executes determination of Step S33 for each of the second player characters contained in the field-of-view image, and executes processing of Step S34 or Step S35 depending on the determination result. In Step S36, the processor 10 determines whether or not the processor 10 has finished processing for all the second player characters contained in the field-of-view image. When the processor 10 finishes processing for all the second player characters (Step S36: YES), the processor 10 ends the processing of the transparency control in FIG. 16. In the following, a description is given of the determination processing to be executed for each of the second player characters.

In Step S32, the processor 10 selects one second player character for determination. In Step S33, the processor 10 determines whether or not the state of the selected second player character relative to the first player character is a predetermined state defined in advance. In resposne to a determination that the second player character is not in the predetermined state, in Step S34, the processor 10 sets the transparency rate of at least a portion of the second player character to a value larger than 0. On the other hand, in response to a determination that the second player character is in the predetermined state, in Step S35, the processor 10 sets the transparency rate of the second player character to 0 (non-transparent).

Figure 17:
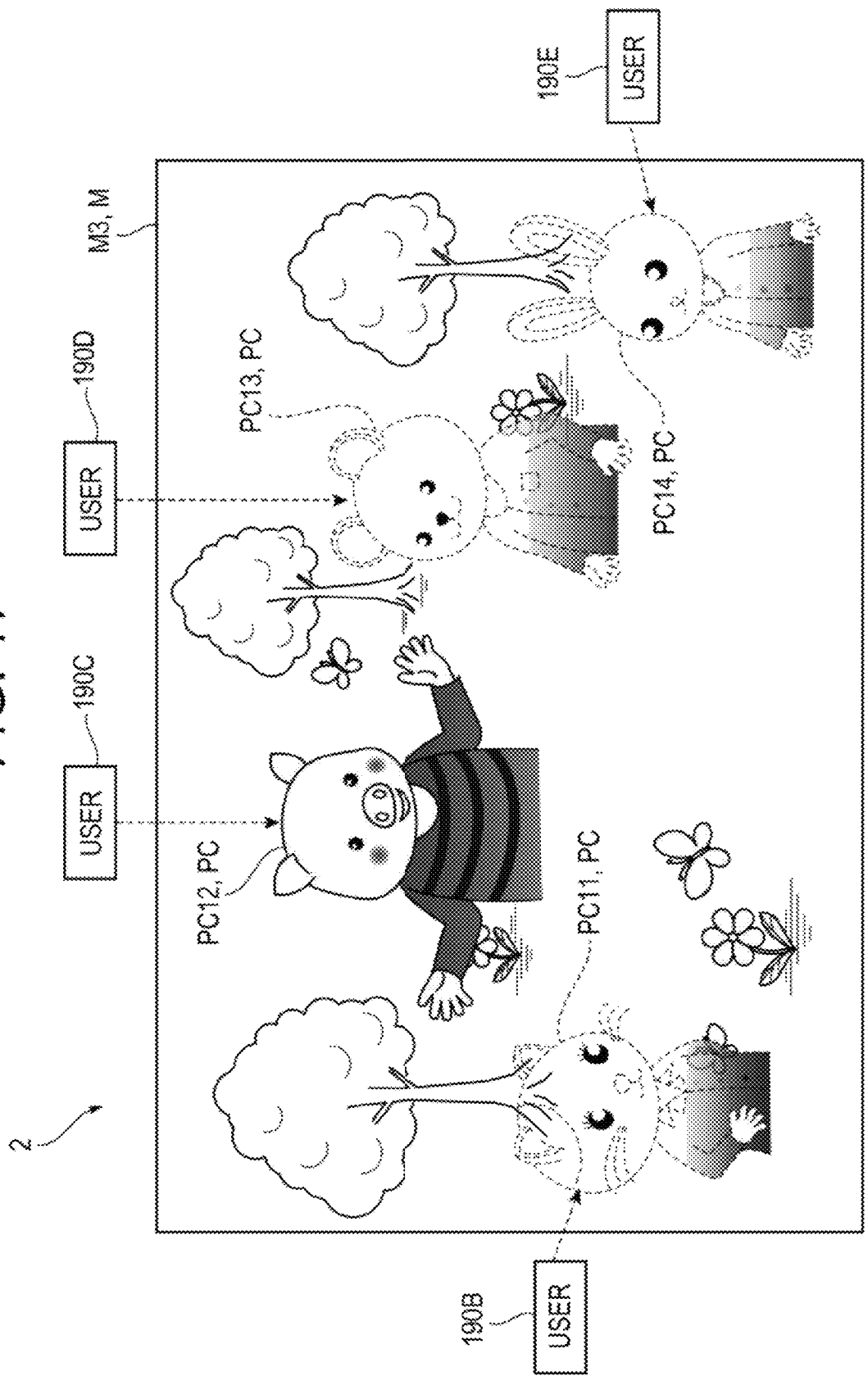
FIG. 17 is a diagram of a field-of-view image (field-of-view image M3) including transparency control of a player character according to at least one embodiment.

FIG. 17 is a diagram (field-of-view image M3) of the field-of-view image including transparency control of the player character PC according to at least one embodiment. The field-of-view image M3 is a field-of-view image obtained when the processing in FIG. 16 is executed with a state of the second player character uttering a voice toward the first player character (or group containing first player character) (hereinafter referred to as "uttering state") being set as the predetermined state.

In FIG. 17, in the field-of-view image M3, only the player character PC12 is uttering a voice toward the group containing the first player character. Thus, in Step S33, the processor 10 determines that the player character PC12 is in the uttering state, and executes the processing of Step S35. On the other hand, the processor 10 determines that the other player characters PC11, PC13, and PC14 are not in the uttering state in Step S33, and executes the processing of Step S34.

The determination of the uttering state described above (Step S33) is executed in the following manner, for example. Specifically, when a voice uttered by the second player character is ready to be transmitted to the user 190A (HMD system 100A) and the second player character is uttering a voice, the processor 10 may determine that the second player character is in the uttering state. The processor 10 may determine that the second player character is not in the uttering state in other cases. The state of a voice uttered by the second player character being ready to be transmitted to the user 190A (HMD system 100A) means a state of a predetermined condition being satisfied. For example, the predetermined condition may specify that a distance between the first player character and the second player character in the virtual space 2 is equal to or smaller than a predetermined distance.

Through the processing described above, the processor 10 generates the field-of-view image M3 in which only the player character PC12 is displayed in a non-transparent manner and the other player characters PC11, PC13, and PC14 are displayed in a transparent manner. In FIG. 17, in Step S34 described above, the processor 10 sets the transparency rate for each of the player characters PC11, PC13, and PC14 to be displayed in a transparent manner so that the transparency rate of a position in each player character becomes larger gradually as the position becomes higher from the lower part toward the upper part. As a result, each of the player characters PC11, PC13, and PC14 is displayed on the field-of-view image M3 so that the degree of transparency becomes larger as the position becomes higher from the lower part (hip part) toward the upper part (top of head).

With the transparency control based on the uttering state described above, the second player character (player character PC12 in example of FIG. 17), which is in the uttering state and to be paid attention to, is able to become conspicuous among the other player characters PC11, PC13, and PC14 on the field-of-view image M3. With this, the user 190A can easily recognize who is uttering a voice in the virtual space 2 even when there are many users (player characters PC) sharing the virtual space 2. Therefore, communication is allowed among the users to be smoother in a VR chat.

As described above, the transparency rate of an upper part (head part) that is likely to attract more attention can be made larger than that of a lower part (hip part) by setting the transparency rate of a position in the player character PC to be displayed in a transparent manner to be larger as the position becomes higher from the lower part toward the upper part. With this, presence in the virtual space 2 of the player character PC to be displayed in a transparent manner is appropriately weakened. At the same time, the user 190A is able to notice presence of the player character PC by setting the transparency rate of a part close to the lower part (hip part) to be smaller compared to the upper part (head part) to induce recognition of the part closer to the lower part of the player character PC. With this, the entertainment value (e.g., sense of unity) of virtual experiences in which the plurality of users share the same virtual space 2 is maintained.

Figure 18:
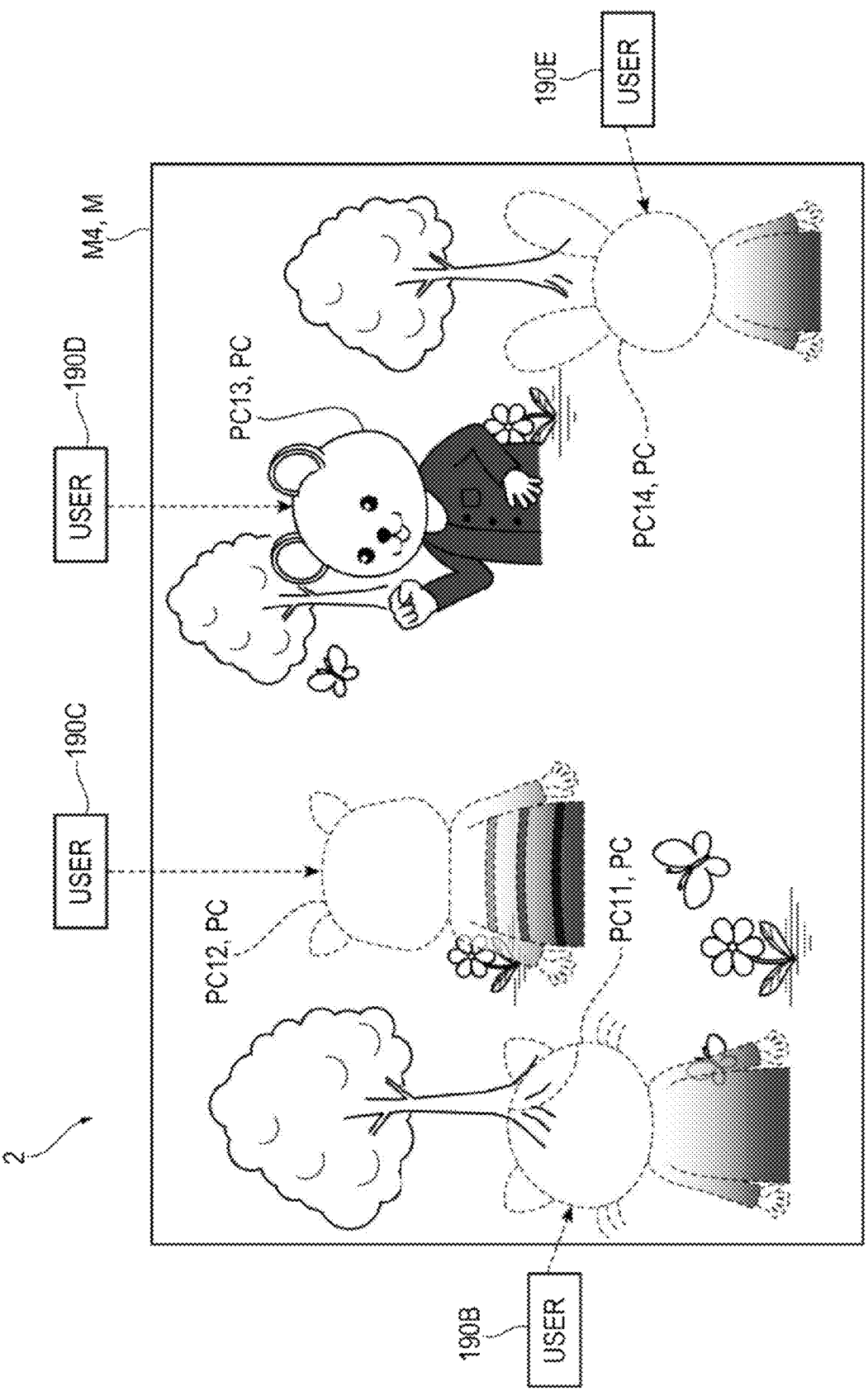
FIG. 18 is a diagram of a field-of-view image (field-of-view image M4) including transparency control of a player character according to at least one embodiment.

FIG. 18 is a diagram (field-of-view image M4) of the field-of-view image including transparency control of the player character PC according to at least one embodiment. The field-of-view image M4 is a field-of-view image obtained when the processing in FIG. 16 is executed with a state of the second player character facing the first player character (hereinafter referred to as "facing state") being set as the predetermined state.

In FIG. 18, in the field-of-view image M4, only the player character PC13 faces the first player character and the other player characters PC11, PC12, and PC14 turn their backs on the first player character. Thus, in Step S33, the processor 10 determines that the player character PC13 is in the facing state, and executes the processing of Step S35. On the other hand, the processor 10 determines that the other player characters PC11, PC12, and PC14 are not in the facing state in Step S33, and executes the processing of Step S34.

The determination of the facing state described above (Step S33) is executed in the following manner, for example. That is, the processor 10 may determine that the second player character is in the facing state when a predetermined face part (e.g., eyes) of the second player character is displayed on the field-of-view image M4. The processor 10 may determine that the second player character is not in the facing state in other cases.

Through the processing described above, the processor 10 generates the field-of-view image M4 in which only the player character PC13 is displayed in a non-transparent manner and the other player characters PC11, PC12, and PC14 are displayed in a transparent manner. In FIG. 18, similarly to FIG. 17, the player characters PC11, PC12, and PC14 are displayed so that the degree of transparency becomes larger as a position in each of the player characters PC11, PC12, and PC14 becomes higher from the lower part (hip part) toward the upper part (top of head).

With the transparency control based on the facing state described above, the second player character (player character PC13 in example of FIG. 18), which is in the facing state and communicating with the first user (or highly likely to communicate with the first user), is able to become conspicuous among the other player characters PC11, PC12, and PC14 on the field-of-view image M4. With this, the user 190A can easily recognize the communication partner (or potential communication partner) even when there are many users (player characters PC) sharing the virtual space 2. Therefore, communication is allowed among the users to be smoother in a VR chat.

This concludes the description of some embodiments of this disclosure. However, the description of some embodiments is not to be read as a restrictive interpretation of the technical scope of this disclosure. The embodiments are merely given as examples, and would be understood by a person skilled in the art as permitting various modifications to be made to the embodiments within the scope of this disclosure set forth in the appended claims. Thus, the technical scope of this disclosure is to be defined based on the scope of this disclosure set forth in the appended claims and an equivalent scope thereof.

For example, the processing of setting the transparency rate of the second player character depending on the state thereof relative to the first player character, which is described as the third example of the transparency control, may be applied to the first or second example of the transparency control. Specifically, the processor 10 may set a difference in transparency rate among the second player characters depending on the states of the second player characters relative to the first player character in FIG. 14 or FIG. 15.

In FIG. 17 or FIG. 18, in Step S35, the processor 10 does not necessarily need to set the transparency rate of the second player character to 0 (non-transparent). For example, in Step S35, the processor 10 may set the transparency rate (>0) smaller than the transparency rate set in Step S34 as the transparency rate of the second player character. With such a configuration, a second player character in a predetermined state can be made more conspicuous than second player characters not in the predetermined state, and the effect of the third example described above can be obtained.

In at least one embodiment, the example of making a second player character in a predetermined state more conspicuous by displaying second player characters not in the predetermined state in a transparent manner has been described, but the method of making a second player character in a predetermined state more conspicuous is not limited to this example. For example, the processor 10 may display second player characters not in the predetermined state darkly by decreasing brightness of those second player characters. Alternatively, the processor 10 may display a second player character in a predetermined state brightly by increasing brightness of the second player character. In this manner, the processor 10 may execute display mode control other than the transparency control to make a second player character in a predetermined state more conspicuous.

The distribution of functions to be executed by each HMD system 100 and the server 150 to implement a VR chat is not limited to the example described above, and various kinds of distribution configurations may be adopted. For example, in the example described above, a description has been given of a configuration in which the HMD system 100, which transmits player information, generates emotion data for representing emotion of the user who uses the system. However, the processing configuration for the plurality of HMD systems 100 to share emotion data of the users is not limited to the configuration described above. For example, the HMD system 100, which receives player information, may generate emotion data based on face tracking data or sound data contained in the received player information. In this case, there is no need to include the emotion data in player information, and thus the data communication amount involved with transmission/reception of the player information may be reduced.

A part or all of the functions to be executed by the computer 200 of each HMD system 100 described above may be consolidated into the server 150. For example, as described below, a configuration may be adopted in which the server 150 executes processing of generating and outputting the field-of-view image, and each HMD device 110 receives the field-of-view image from the server 150 for display. In other words, the server 150 holds data (e.g., space information 241 and object information 242) for defining the virtual space 2 shared by the plurality of HMD devices 110. The HMD sensor 120 of each HMD device 110 transmits information on the position and inclination of the HMD device 110 to the server 150. The server 150 generates a field-of-view image in accordance with the position and inclination of each HMD device 110, and transmits field-of-view image data for displaying the field-of-view image to each HMD device 110. In this case, for example, the server 150 executes processing of, for example, Step S1, Step S9, and Step S10 of FIG. 10 described above.

Supplementary Note 1

Item 1

An information processing method to be executed by a computer 200 to provide a first user (user 190A) with a virtual space 2 via a first head-mounted display (HMD device 110A). The information processing method includes generating (e.g., Step S1 of FIG. 10) virtual space data for defining the virtual space 2 containing a first player character associated with the first user, a second player character (player characters PC11 to PC14) associated with a second user (users 190B to 190E), and a virtual camera 1 for defining a field-of-view image M to be provided to the first head-mounted display. The method further includes setting (e.g., Step S10 of FIG. 10) a transparency rate of the second player character contained in the field-of-view image M. The second player character includes a first part (e.g., head part and hand part), movement of which in the virtual space 2 is controlled in synchronization with movement of the second user, and a second part (e.g., body part and arm part), which is displayed in connection with the first part. The setting includes setting a transparency rate of at least a portion of the second part larger than a transparency rate of the first part.

According to the information processing method of Item 1, the entertainment value of virtual experiences in which the plurality of users share the virtual space by displaying the first part more clearly than the second part and facilitating communication among the users is maintained. At the same time, visibility of a 360-degree panorama video by the first user in the virtual space 2 by displaying at least the portion of the second part, which is displayed in connection with the first part, in a transparent manner is improved. In this manner, visibility in the virtual space 2 may be improved while ensuring the entertainment value of virtual experiences in which the plurality of users share the virtual space 2.

Item 2

An information processing method according to Item 1, in which the first part includes a portion corresponding to at least one of a head part or a hand part of the second player character. The second part includes a portion corresponding to a body part of the second player character.

According to the information processing method of Item 2, the first user is able to easily recognize, for example, facial expressions and gestures of the second player character. With this, communication is facilitated among the users.

Item 3

An information processing method according to Item 1 or 2, in which the setting includes setting a transparency rate of the entire second part to a constant value.

Item 4

An information processing method according to Item 1 or 2, in which the setting includes setting a transparency rate of a position in the second part to become larger gradually as the position becomes farther away from the first part.

According to the information processing method of Item 4, a sense of strangeness felt by the first user, which is caused by transparent display of the second player character, is reduced by gradation representation in which the transparency rate (degree of transparency) gradually changes.

Item 5

An information processing method according to any one of Items 1 to 4, in which the setting includes setting the transparency rate of the second player character in accordance with a state of the second player character relative to the first player character.

According to the information processing method of Item 5, adjusting the degree to which the second player character is conspicuous in the field-of-view image based on the state of the second player character relative to the first player character is possible.

Item 6

A system for executing the information processing method of any one of Items 1 to 5.

Item 7

An apparatus, including:
a memory having having instructions stored thereon; and
a processor coupled to the memory and configured to execute the method of any one of Items 1 to 5.

Supplementary Note 2

Item 8

An information processing method to be executed by a computer 200 to provide a first user (user 190A) with a virtual space 2 via a first head-mounted display (HMD device 110A). The information processing method includes generating (e.g., Step S1 of FIG. 10) virtual space data for defining the virtual space 2 containing a first player character associated with the first user, a second player character (player characters PC11 to PC14) associated with a second user (users 190B to 190E), and a virtual camera 1 for defining a field-of-view image M to be provided to the first head-mounted display. The method further includes determining (e.g., Step S10 of FIG. 10) a mode of display of the second player character contained in the field-of-view image M in accordance with a state of the second player character relative to the first player character.

According to the information processing method of Item 8, adjusting the degree to which the second player character is conspicuous by determining the mode of display of the second player character in accordance with the state of the second player character relative to the first player character is possible. Therefore, the first user is presented with the second player character to be paid attention to conspicuously in the field-of-view image. With this, communication among the plurality of users is smoother in virtual experiences in which those users share the virtual space 2.

Item 9

An information processing method according to Item 8, in which the determining includes setting a transparency rate of the second player character in accordance with the state of the second player character relative to the first player character.

According to the information processing method of Item 9, appropriately adjusting the degree to which the second player character is conspicuous by setting the transparency rate of the second player character in accordance with the state of the second player character relative to the first player character is possible.

Item 10

An information processing method according to Item 9, in which the determining includes setting a transparency rate of a position in the second player character to become larger gradually as the position becomes higher from a lower part of the second player character toward an upper part of the second player character.

According to the information processing method of Item 10, the transparency rate of the conspicuous upper part (e.g., head part) is larger compared to the lower part (e.g., hip part). With this, appropriately weakening a presence in the virtual space 2 of the second player character to be displayed in a transparent manner is possible.

Item 11

An information processing method according to Item 9 or 10, in which the determining includes setting the transparency rate of the second player character so that the transparency rate at a time when the second player character is in a state of uttering a voice toward the first player character is smaller than the transparency rate at a time when the second player character is not in the state of uttering a voice.

According to the information processing method of Item 11, even when there are many users (player characters PC) sharing the virtual space 2, the first user is able to easily recognize the user (player character PC) speaking in the virtual space 2. Therefore, communication is possible among the users to be smoother in a VR chat.

Item 12

An information processing method according to Item 9 or 10, in which the determining includes setting the transparency rate of the second player character so that the transparency rate at a time when the second player character is in a state of facing the first player character is smaller than transparency rate at a time when the second player character is not in the state of facing the first player character.

According to the information processing method of Item 12, the first user is able to easily recognize a communication partner (or potential communication partner) in the virtual space 2 even when there are many users (player characters PC) sharing the virtual space 2. Therefore, communication is possible among the users to be smoother in a VR chat.

Item 13

A system for executing the information processing method of any one of Items 8 to 12.

Item 14

An apparatus, including: a memory having instructions stored thereon; and a processor coupled to the memory and configured to execute the instructions for executing the method of any one of Items 8 to 12.

What is claimed is:

1. A method, comprising:
defining a virtual space, the virtual space containing:
a player character associated with a first user, and
a virtual viewpoint for defining field-of-view images to be provided to a first head-mounted display (HMD) associated with a second user;
setting a first transparency rate of a first part of the player character, wherein the first part of the player character includes a head and a hand of the player character;
setting a second transparency rate of a portion of a second part of the player character, wherein the second part is different from the first part, wherein the second transparency rate is greater than the first transparency rate;
determining whether the player character is communicating, wherein the determining whether the player character is communicating comprises determining whether the player character is facing toward the virtual viewpoint;
identifying a second player character that is not communicating, wherein the second player character has a third transparency rate; and
setting the first transparency rate or the second transparency rate to be less than the third transparency rate in response to a determination that the player character is communicating.

2. The method according to claim 1, wherein the setting the second transparency rate comprises decreasing the second transparency rate in response to receiving an input from the first user.

3. The method according to claim 1, wherein the setting the first transparency rate comprises decreasing the first transparency rate in response to receiving an input from the first user.

4. The method according to claim 1, wherein the setting the second transparency rate comprises increasing the second transparency rate in response to failing to receive an input from the first user.

5. The method according to claim 1, wherein the setting the first transparency rate comprises increasing the first transparency rate in response to failing to receive an input from the first user.

6. A system comprising:
a non-transitory computer readable medium configured to store instructions thereon; and
a processor connected to the non-transitory computer readable medium, wherein the processor is configured to execute the instructions for:
defining a virtual space, the virtual space containing:
a player character associated with a first user, and
a virtual viewpoint for defining field-of-view images to be provided to a first head-mounted display (HMD) associated with a second user;
setting a first transparency rate of a first part of the player character, wherein the first part of the player character includes a head and a hand of the player character;
setting a second transparency rate of a portion of a second part of the player character, wherein the second part is different from the first part, wherein the second transparency rate is greater than the first transparency rate;
determining whether the player character is communicating, wherein the determining whether the player character is communicating comprises determining whether the player character is facing toward the virtual viewpoint;
identifying a second player character that is not communicating, wherein the second player character has a third transparency rate; and
setting the first transparency rate or the second transparency rate to be less than the third transparency rate in response to a determination that the player character is communicating.

7. The system according to claim 6, wherein the processor is further configured to execute the instructions for decreasing the second transparency rate in response to receiving an input from the first user.

8. The system according to claim 6, wherein the processor is further configured to execute the instructions for decreasing the first transparency rate in response to receiving an input from the first user.

9. The system according to claim 6, wherein the processor is further configured to execute the instructions for increasing the second transparency rate in response to failing to receive an input from the first user.

10. The system according to claim 6, wherein the processor is further configured to execute the instructions for increasing the first transparency rate in response to failing to receive an input from the first user.

11. A method, comprising:
defining a virtual space, the virtual space containing:
a plurality of player characters, wherein a first player character of the plurality of player characters is associated with a first user, and
a virtual viewpoint for defining field-of-view images to be provided to a first head-mounted display (HMD) associated with a second user;
setting a first transparency rate of a first part of each of the plurality of p layer characters, wherein the first part of each of the plurality of player characters includes a head and a hand of a corresponding player character;
decreasing the first transparency rate of the first player character in response to receiving an utterance input from the first user;
identifying a second player character of the plurality of player characters that is not communicating; and
setting the first transparency rate of the first player character to be less than the first transparency rate of the second player character in response to the first player character facing toward the virtual viewpoint.

12. The method according to claim 11, further comprising setting the first transparency rate of the first player character to be less than the first transparency rate of the second player character in response to receiving the utterance input from the first user.

13. The method according to claim 12, further comprising increasing the first transparency rate of the second player character in response to receiving the utterance input from the first user.

14. The method according to claim 11, further comprising increasing the first transparency rate of the second player character in response to the second player character facing away from the virtual viewpoint.

15. The method according to claim 11, further comprising setting a second transparency rate of a second part of the first player character, wherein the second transparency rate is different from the first transparency rate.

* * * * *